(12) United States Patent
Lindblom et al.

(10) Patent No.: US 9,355,581 B2
(45) Date of Patent: May 31, 2016

(54) AIRFRAME DISPLAY SYSTEMS AND METHODS

(71) Applicant: Skyline Displays, Inc., Eagan, MN (US)

(72) Inventors: Curtis H. Lindblom, Oakdale, MN (US); John Elliott, Eagan, MN (US); Jim Sommerville, White Bear Lake, MN (US); Nathaniel J. Nelson, Minneapolis, MN (US)

(73) Assignee: Skyline Displays, Inc., Eagan, MN (US)

( * ) Notice: Subject to any disclaimer, the term of this patent is extended or adjusted under 35 U.S.C. 154(b) by 0 days.

(21) Appl. No.: 14/355,442

(22) PCT Filed: Oct. 26, 2012

(86) PCT No.: PCT/US2012/062034
§ 371 (c)(1),
(2) Date: Apr. 30, 2014

(87) PCT Pub. No.: WO2013/066738
PCT Pub. Date: May 10, 2013

(65) Prior Publication Data
US 2014/0290104 A1    Oct. 2, 2014

Related U.S. Application Data

(60) Provisional application No. 61/555,347, filed on Nov. 3, 2011, provisional application No. 61/609,693, filed on Mar. 12, 2012.

(51) Int. Cl.
G09F 15/00 (2006.01)
G09F 13/02 (2006.01)
G09F 13/04 (2006.01)

(52) U.S. Cl.
CPC ............... *G09F 15/00* (2013.01); *G09F 13/02* (2013.01); *G09F 15/0025* (2013.01); *G09F 15/0062* (2013.01); *G09F 2013/0463* (2013.01); *G09F 2013/0468* (2013.01)

(58) Field of Classification Search
CPC .............................. G09F 1/12; G09F 15/0062
USPC .................................................... 40/610, 736
See application file for complete search history.

(56) References Cited

U.S. PATENT DOCUMENTS

| | | |
|---|---|---|
| 3,729,847 A | 5/1973 | Chandos |
| 4,068,418 A | 1/1978 | Masse |
| 4,369,591 A | 1/1983 | Vicino |
| 4,802,734 A | 2/1989 | Walter |
| 4,876,829 A | 10/1989 | Mattick |

(Continued)

FOREIGN PATENT DOCUMENTS

| | | |
|---|---|---|
| EP | 0085270 A1 | 8/1983 |
| EP | 0647751 A2 | 4/1995 |

(Continued)

*Primary Examiner* — Joanne Silbermann
(74) *Attorney, Agent, or Firm* — Thomas J. Oppold; Larkin Hoffman Daly & Lindgren, Ltd.

(57) ABSTRACT

An airframe display system and method. The airframe display system has an airtight airframe having at least one airbeam. The airbeam has a sleeve of dimensionally stable material. A stretch fabric cover is received over the airframe whereby, upon inflation, the airframe is substantially rigid and the stretch fabric cover is taut over the airframe defining a display surface area.

91 Claims, 42 Drawing Sheets

(56) References Cited

U.S. PATENT DOCUMENTS

| | | | |
|---|---|---|---|
| 5,005,322 A | 4/1991 | Mattick et al. | |
| RE33,709 E | 10/1991 | Vicino | |
| 5,183,329 A | 2/1993 | Chen | |
| 5,205,086 A * | 4/1993 | Heim | 52/2.13 |
| 5,402,591 A | 4/1995 | Lee | |
| 5,421,128 A | 6/1995 | Sharpless et al. | |
| 5,546,707 A | 8/1996 | Caruso | |
| 5,586,594 A | 12/1996 | Shapoff | |
| 5,677,023 A | 10/1997 | Brown | |
| 5,678,357 A | 10/1997 | Rubio et al. | |
| 5,735,083 A | 4/1998 | Brown et al. | |
| 5,778,581 A | 7/1998 | Bailey | |
| 5,941,272 A * | 8/1999 | Feldman | 137/223 |
| 5,987,822 A | 11/1999 | McNiff et al. | |
| 6,192,633 B1 | 2/2001 | Hilbert | |
| 6,240,666 B1 | 6/2001 | Apel et al. | |
| 6,263,617 B1 | 7/2001 | Turcot et al. | |
| 6,298,970 B1 | 10/2001 | Targiroff et al. | |
| 6,543,730 B2 | 4/2003 | Pedretti | |
| 6,668,475 B2 | 12/2003 | Carolan | |
| 6,804,905 B1 | 10/2004 | Burger, III et al. | |
| 6,874,263 B2 | 4/2005 | Ohmuku | |
| 7,114,276 B2 | 10/2006 | Scherba | |
| 7,181,877 B2 * | 2/2007 | Quade | 40/610 |
| 7,213,357 B2 | 5/2007 | Scherba | |
| 7,240,445 B2 | 7/2007 | Barlow | |
| 7,446,937 B2 | 11/2008 | Poretskin | |
| 7,490,426 B2 * | 2/2009 | Scarberry | 40/610 |
| 7,552,555 B2 | 6/2009 | Pellecuer et al. | |
| 7,942,533 B2 | 5/2011 | Ganzevoort | |
| 7,961,388 B1 | 6/2011 | Deutsch et al. | |
| 8,215,041 B2 | 7/2012 | Hill | |
| 2002/0083653 A1 | 7/2002 | Hilbert | |
| 2004/0003527 A1 * | 1/2004 | Suen | 40/736 |
| 2004/0093805 A1 * | 5/2004 | Underwood et al. | 52/36.1 |
| 2007/0169803 A1 | 7/2007 | Brensinger | |
| 2008/0168691 A1 * | 7/2008 | Pemberton | 40/600 |
| 2009/0013574 A1 | 1/2009 | Palmer | |
| 2009/0107020 A1 | 4/2009 | Aires | |
| 2011/0030255 A1 | 2/2011 | Morris | |
| 2011/0067279 A1 | 3/2011 | Dos Santos Camacho | |
| 2011/0304908 A1 | 12/2011 | Giammarinaro, Jr. | |
| 2012/0042577 A1 | 2/2012 | McIntosh | |
| 2012/0042578 A1 | 2/2012 | Chen | |
| 2013/0008064 A1 | 1/2013 | Park | |

FOREIGN PATENT DOCUMENTS

| | | | |
|---|---|---|---|
| EP | 1006504 A2 * | 6/2000 | G09F 15/0025 |
| GB | 2335299 A | 9/1999 | |
| WO | 8100125 | 1/1981 | |
| WO | 8304124 A1 | 11/1983 | |
| WO | 8600952 | 2/1986 | |
| WO | 8702438 | 4/1987 | |
| WO | 9015208 | 12/1990 | |
| WO | 2005019568 A1 | 3/2005 | |
| WO | 2005042880 A1 | 5/2005 | |
| WO | 2007071100 A1 | 6/2007 | |
| WO | 2007077269 A1 | 7/2007 | |
| WO | 2008116080 A2 | 9/2008 | |
| WO | 2012076903 A1 | 6/2012 | |

* cited by examiner

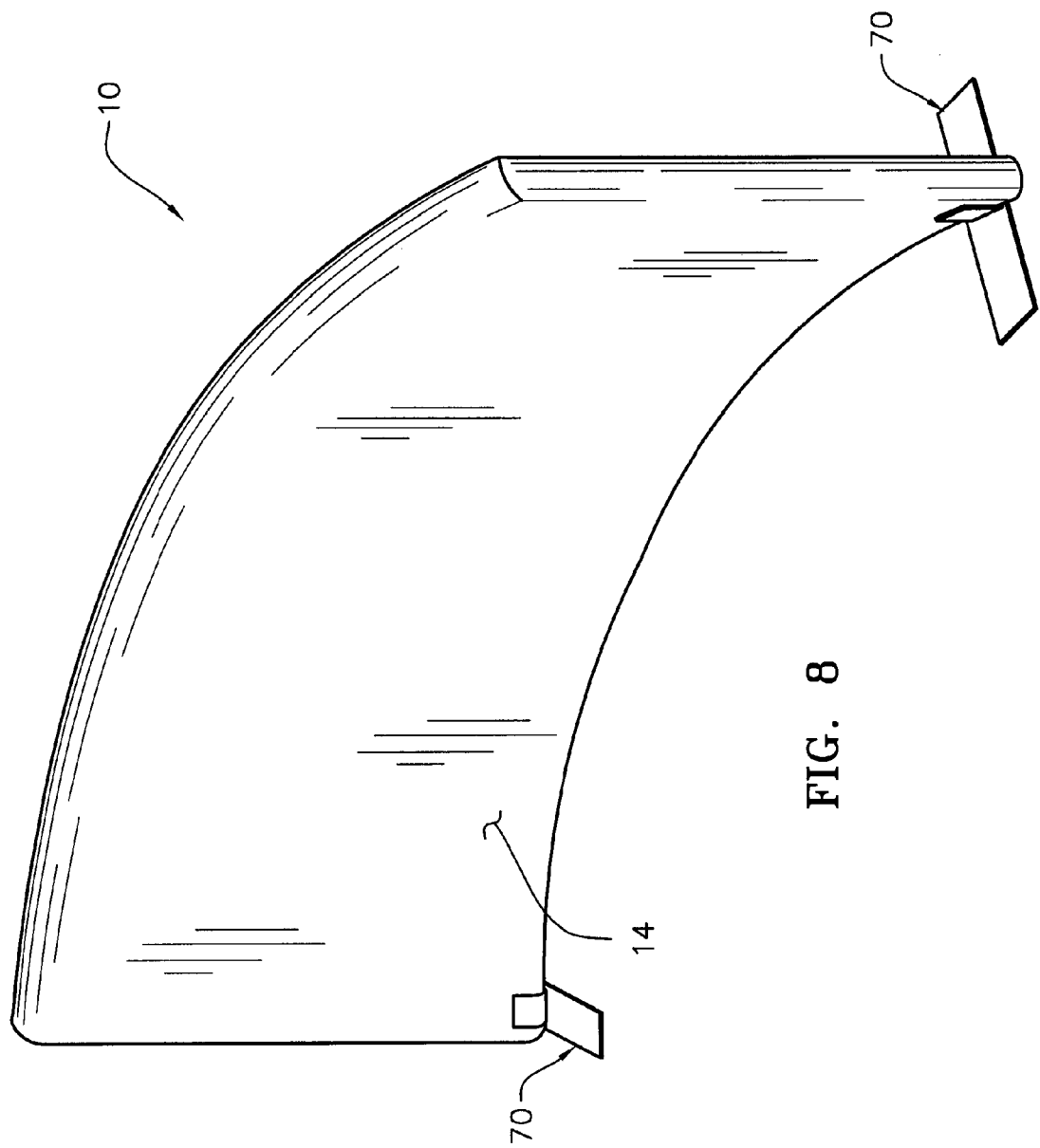

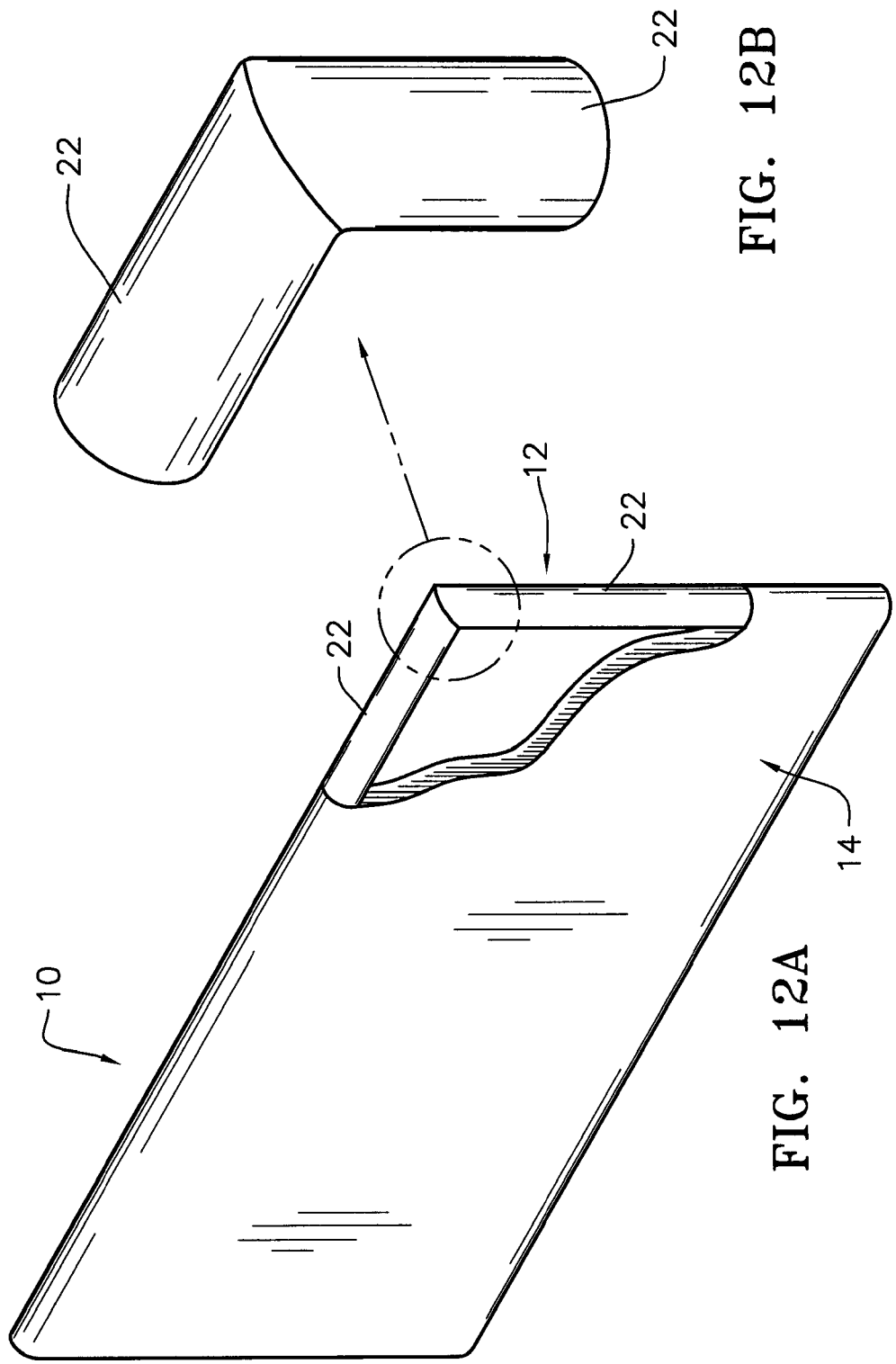

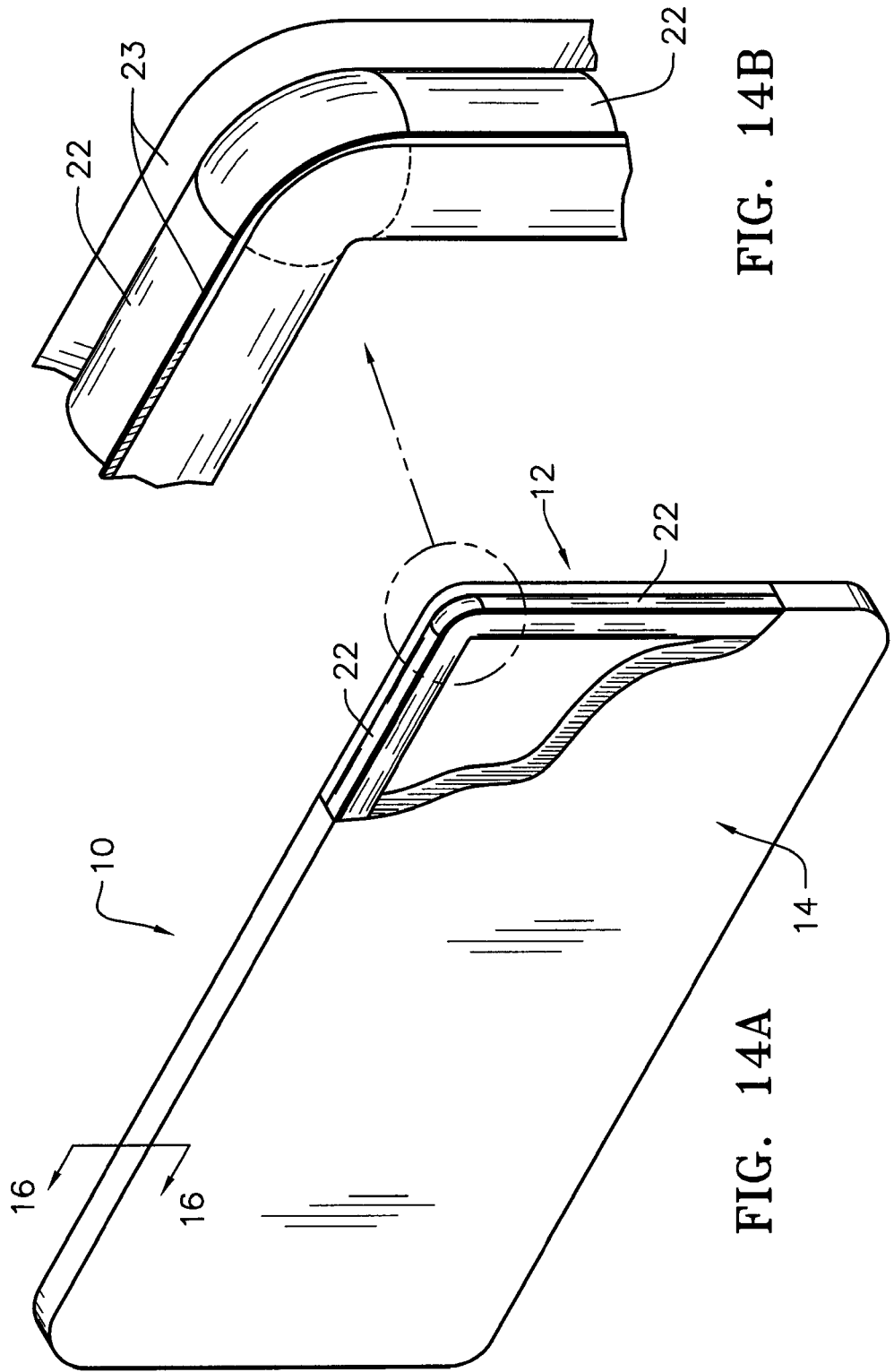

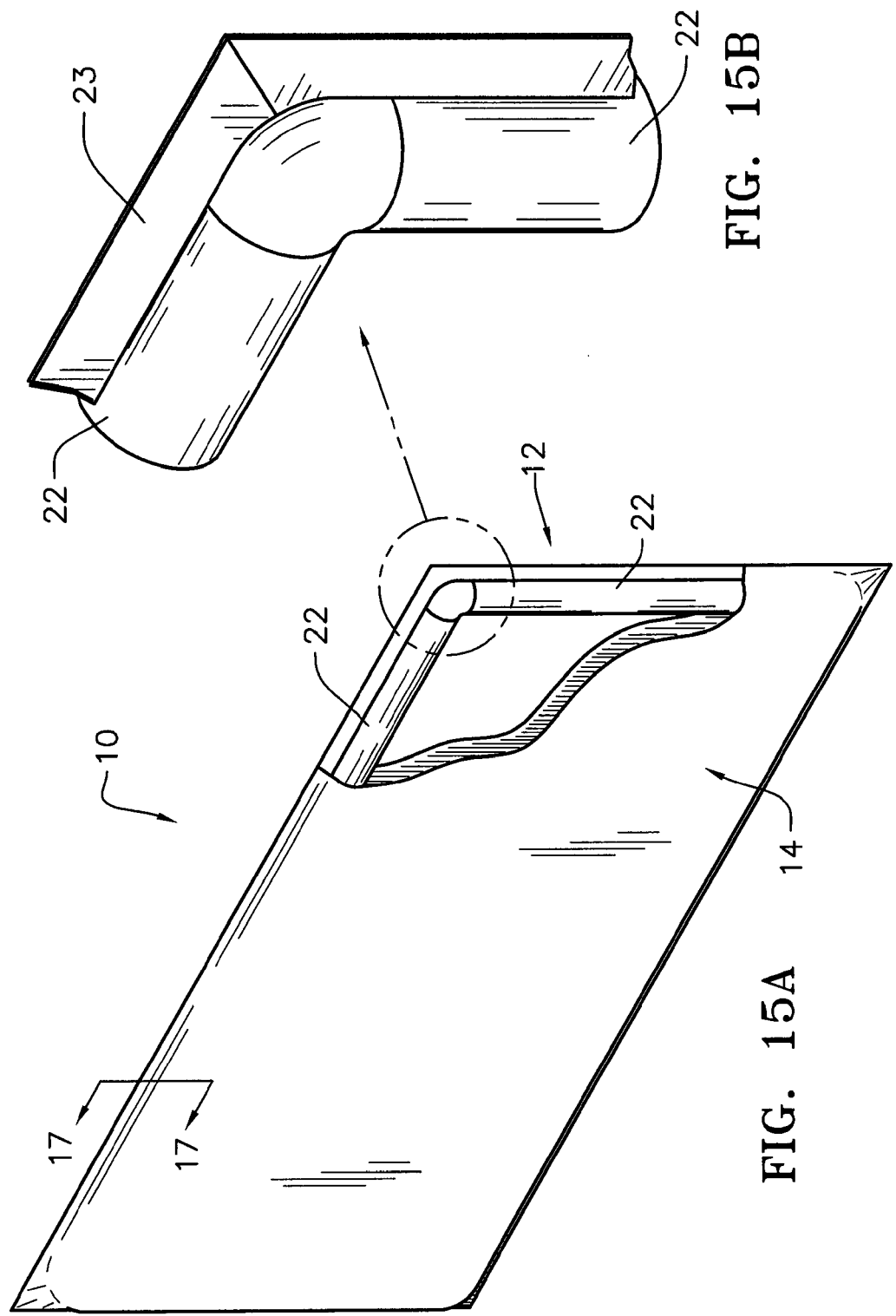

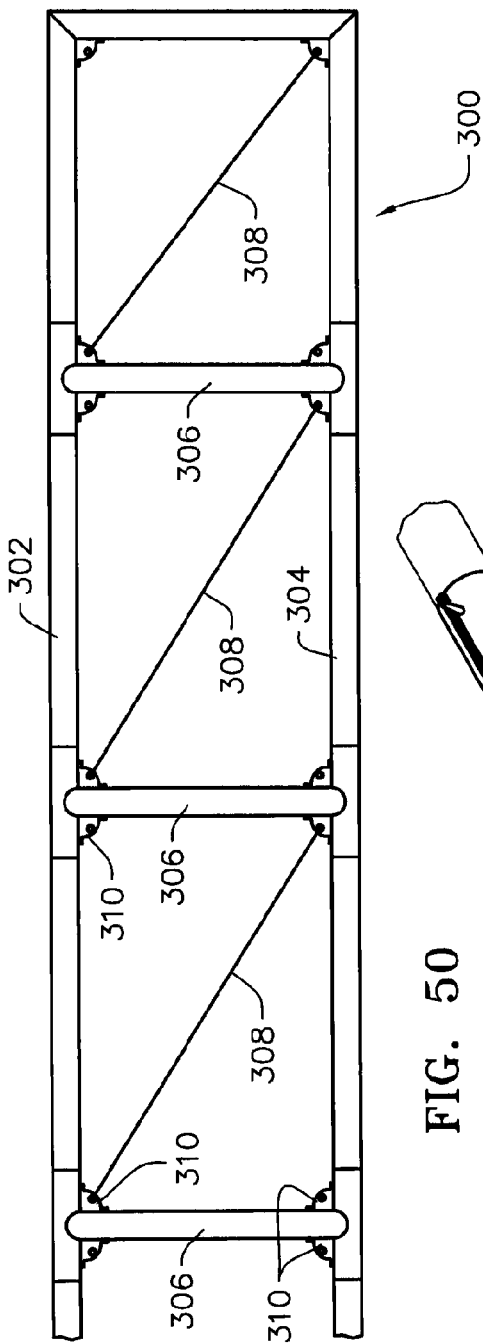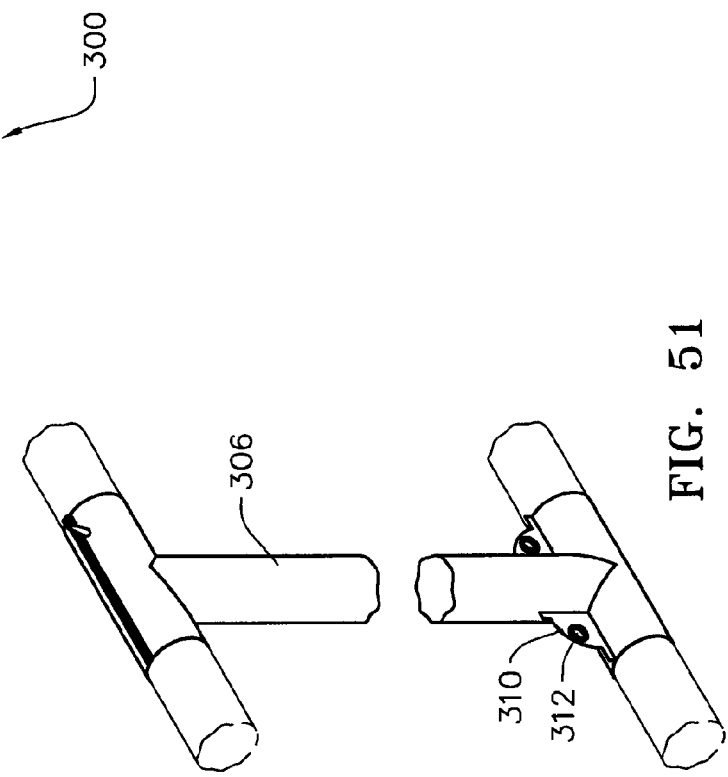
FIG. 50
FIG. 51

AIRFRAME DISPLAY SYSTEMS AND METHODS

BACKGROUND

There are various types of display systems used by exhibitors at tradeshows and by retailers in stores or in kiosks to display merchandise. Some of these display systems may include large island-type displays comprising multi-level structures with trusses, posts and panels. Examples of such display systems include the Tube Ultra® system, the Inliten® exhibit system, the Envoy® exhibit system, the Engage® panel system and the Mosaic® panel system, all available from Skyline Displays, Inc. of Eagan, Minn. ("Skyline'), and as disclosed in the following US patents and published applications: U.S. Pat. No. 6,543,164; U.S. Pat. No. 7,024,834; U.S. Pat. No. 7,040,064 and US2010/0236116. Each of these systems utilize external or internal aluminum frame members to support the walls and/or the printed graphic panels.

Other types of more portable display systems include the Skyline Design View® presentation system, which is disclosed in US Publication No. US2010/0238544. Like the previously identified display systems, the Skyline Design View system comprises an aluminum frame which supports a panel for displaying graphics. Another portable display system is the Skyline Regatta™ system which utilizes shock-corded steel tubes to form a frame over which is stretched a fabric graphic cover that zips closed on one side of the outer perimeter.

Still other types of portable displays include the Skyline Mirage® pop-up display and the Skyline Quest® pop-up display, such as disclosed in U.S. Pat. No. 4,658,560. These displays utilize pivotally joined fiberglass or aluminum rods that "pop-up" or expand from the folded or collapsed position. When fully expanded, the pivoting rods lock into place with connectors to form a lattice-type frame from which graphic panels are supported by magnets and/or hook-and-loop fasteners.

While each of the foregoing tradeshow displays have enjoyed significant commercial success and serve their intended purpose, they each require a frame constructed of rigid members and therefore each requires at least some assembly and disassembly, usually requiring tools, to set up and taken down the display. Additionally, the rigid frame members add significantly to the overall weight of the display system and to the size and bulk of the shipping container for the display system.

It is recognized that inflatable displays may provide advantages over rigid frame displays with respect to weight and set up, but current inflatable display systems often have a balloon or blimp-like appearance making the inflatable displays appear cartoonish such that most are not well suited for tradeshows where the tradeshow participant is attempting to portray a professional, serious or stylish appearing display or booth. Accordingly, there is a need for a display system which provides configuration flexibility, ease of setup and take down without the need for tools, and reduced drayage costs while providing the appearance of a conventional rigid framed display.

DESCRIPTION OF THE DRAWINGS

FIG. 8 is a perspective view of an airframe display system with curvilinear front and back sides.

FIGS. 12A-12B are perspective views of an embodiment of a rectangular airframe with a partial cutaway of the cover to show an embodiment of a mitered corner detail of the airbeams of the airframe.

FIGS. 14A-14B are perspective views of another embodiment of rectangular airframe display system with a partial cutaway of the cover to show an embodiment of a corner detail with for rounded corner fins.

FIGS. 15A-15B are perspective views of another embodiment of rectangular airframe display system with a partial cutaway of the cover to show an embodiment of a corner detail with a single right angle corner fin.

FIGS. 50-51 illustrate an airframe truss for an airframe display system with struts, gussets and diagonal tension members.

DESCRIPTION

Figure 1:
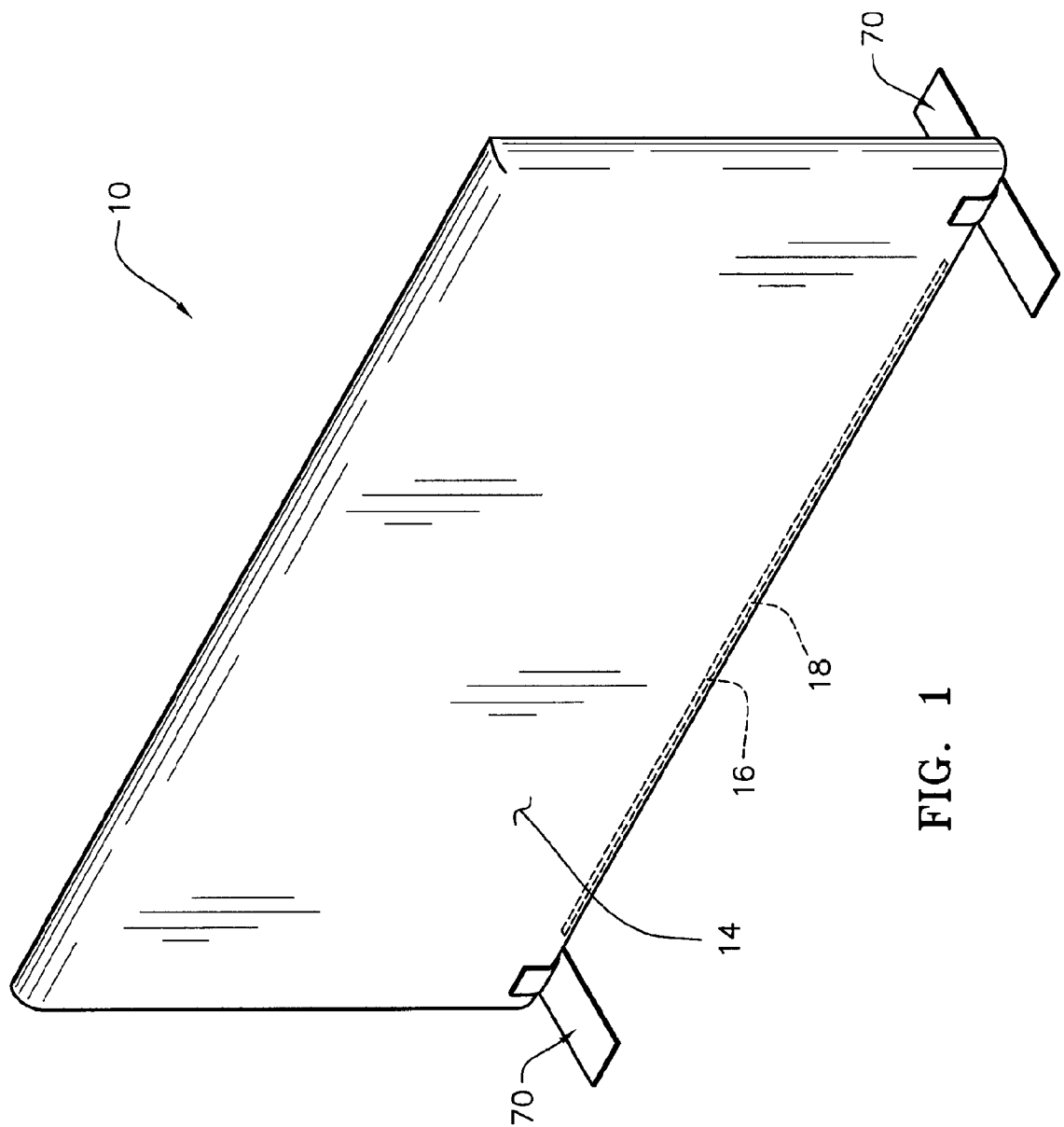
FIG. 1 is a perspective view of an embodiment of an airframe display system.

Referring now to the drawings, wherein like reference numerals designate identical or corresponding parts throughout the several views, FIG. 1 is a perspective view of an airframe display system 10 comprising an airframe 12 (FIG. 2) and a cover 14 on which images, text or other graphics are printed or applied to a display surface. When inflated, the airframe 12 defines the shape of the display system 10 and supports the cover 14 without the need for interior or exterior poles, braces or other rigid framing members. It should be appreciated that the airframe display system 10 may be any desirable two-dimensional or three-dimensional size, shape or configuration and therefore the specific embodiments shown in the drawings are merely intended to illustrate examples of a wide variety of configurations or features that may be incorporated into an airframe display system 10.

The cover 14, which may enclose or cover all or a portion of the airframe 12, is preferably a stretch-fabric material, such as Lycra®, and is preferably sized so that when the airframe 12 is fully inflated, the cover 14 is taut around the airframe 12 and is free of folds or creases that would otherwise distort or obscure the graphics or other copy printed or applied on the cover 14. The cover 14 along with the entire airframe 12, is preferably made of fire retardant material.

In one embodiment, the cover 14 is similar in configuration to a pillowcase which receives the deflated airframe 12 through an opening 16 in one side. Closing means 18, such as a zipper, hook and loop fasteners (e.g. Velcro®), snaps, buttons, ties, laces or any other type of suitable closing means, may be provided for closing the opening 16. The opening 16 and closing means 18 are preferably positioned on the cover 14 such that they are substantially hidden from view, e.g., along a top, bottom or side edge of the display, and which preferably provides easy access to the air port 40 (discussed later) for inflating and deflating the airframe 12 without having to remove the cover 14. If it is desired to change the cover 14 for a different tradeshow or event, or if the cover 14 becomes damaged, the cover can simply be unzipped and removed from the airframe 12 and swapped out with a new or different cover 14.

It may be desirable to construct the cover 14 of multiple layers, for example two or three layers with an interior layering being black or otherwise opaque to minimize shadowing of the airframe 12 or to minimizing the airframe 12 being visible through the cover 14, particularly if the cover is illuminated or backlighted (discussed later). In the two-layer cover embodiment, the inner layer or the layer next to the airframe is preferably black or otherwise opaque and the exterior layer (i.e., the layer on which the graphics are printed or applied) being white, translucent, or any other suitable color for printing or applying graphics. In the three-layered cover embodiment, the black or otherwise opaque layer is preferably the interior or middle layer with the exterior layer (i.e., the layer on which the graphics are printed or displayed) being white, translucent, or any other suitable color for printing or applying graphics.

Figure 3:
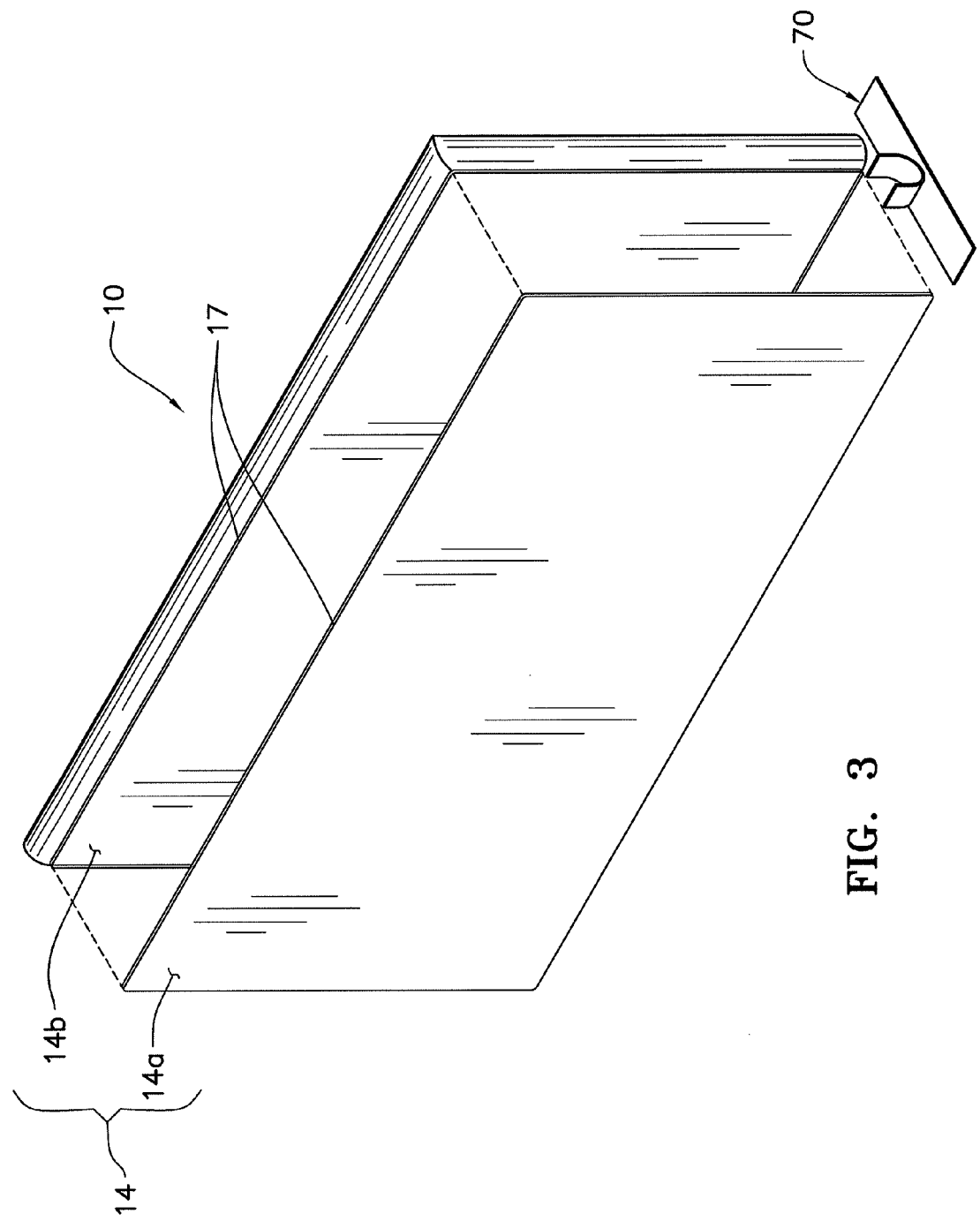
FIG. 3 is a perspective view of another embodiment of an airframe display illustrating an embodiment of removable graphic display panel.

In another embodiment, as illustrated in FIG. 3, the cover 14 may be in two parts with one of the parts comprising a graphic display panel 14a on which the graphics are printed or applied, that unzips or is otherwise removable from an intermediate cover 14b that remains over the airframe 12 so the graphic panel 14a can be easily swapped out without having to remove the entire cover 14 from the airframe 12. In such an embodiment, the mating sides of the graphics display panel 14a and the intermediate cover 14b include cooperating attachment means 17, such as mating halves of a zipper or mating hook and loop fastener elements, snaps, buttons or the like. Thus, when it is desired to swap out one graphic display panel 14a with another, the one graphic display panel can simply be detached from the intermediate cover 14b and a new or different graphic display panel 14a can be attached in its place while the airframe 12 is inflated or deflated.

Figure 2:
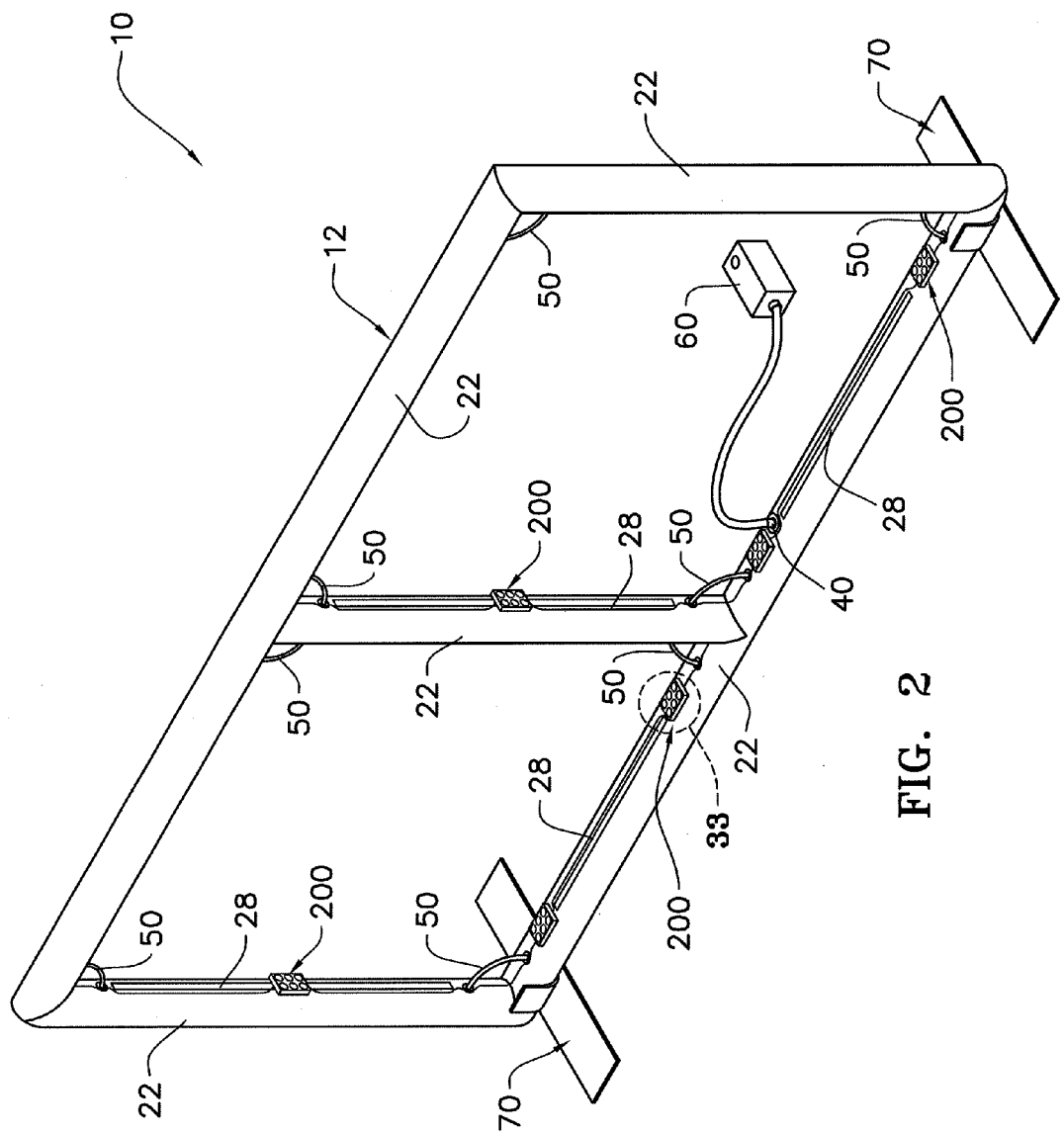
FIG. 2 is a perspective view of the airframe display of FIG. 1 with the cover removed to show an embodiment of the airframe.
Figure 9:
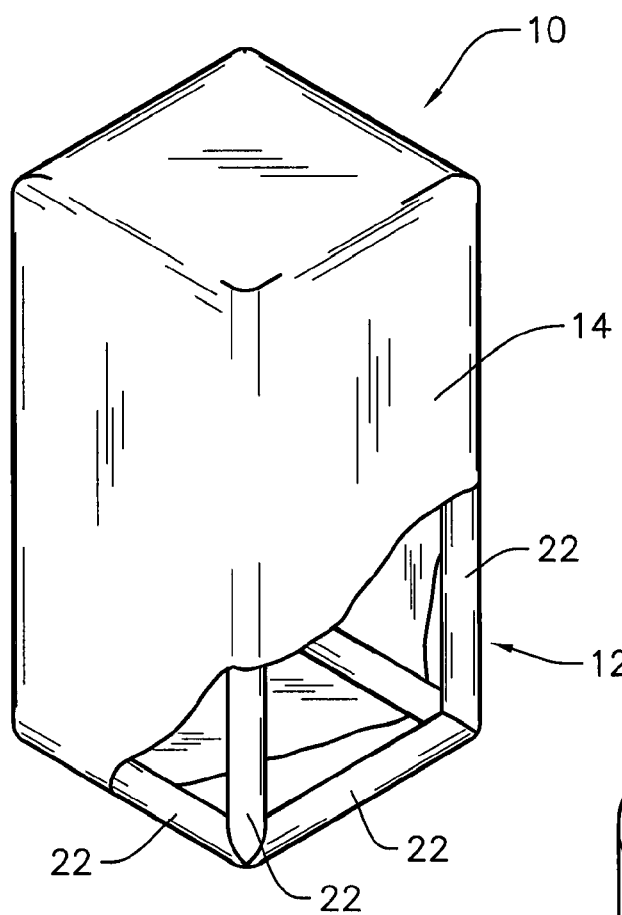
FIG. 9 is a perspective view of a three-dimensional rectangular airframe display with a partial cutaway of the cover to show the airbeams of the airframe.
Figure 10:
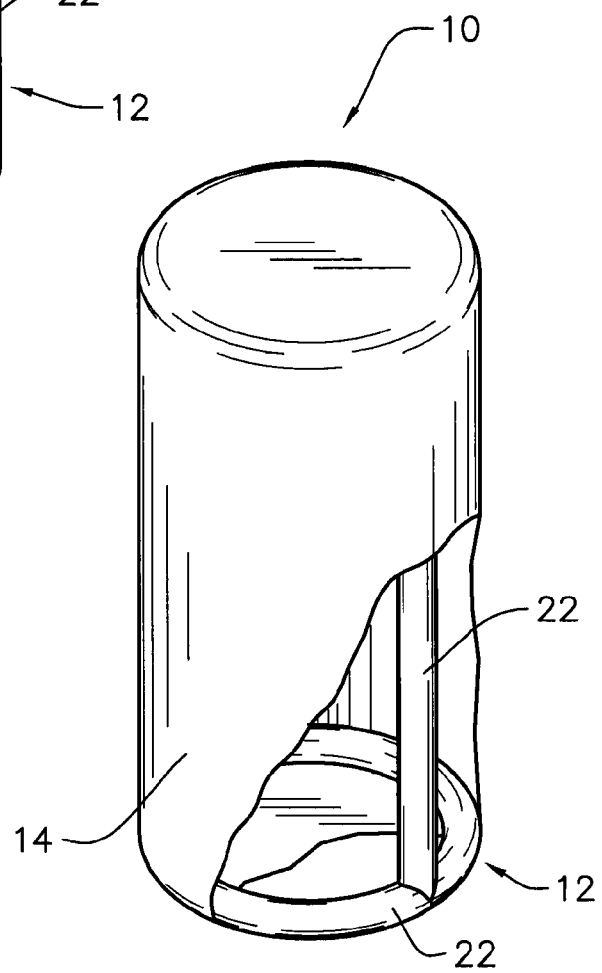
FIG. 10 is a perspective view of a three-dimensional cylindrical airframe display with a partial cutaway of the cover to show the airbeams of the airframe.
Figure 62:
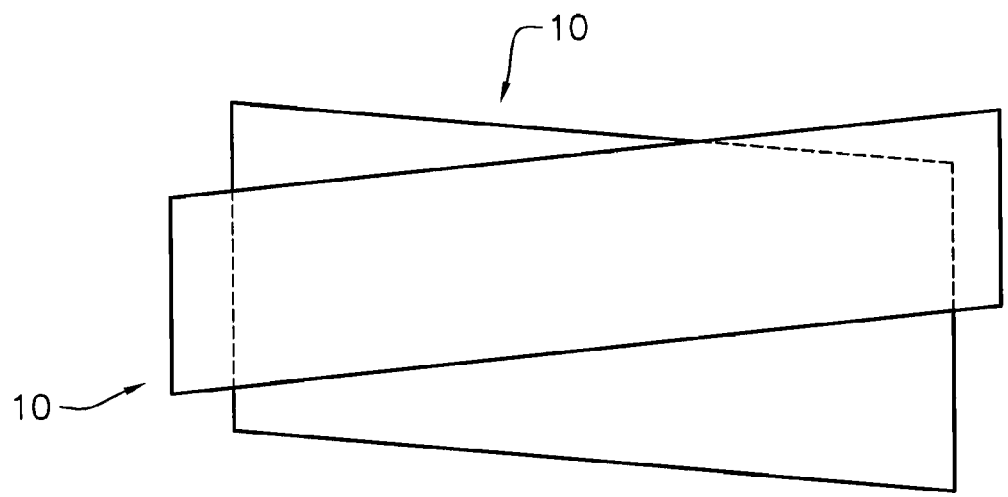
Figure 63:
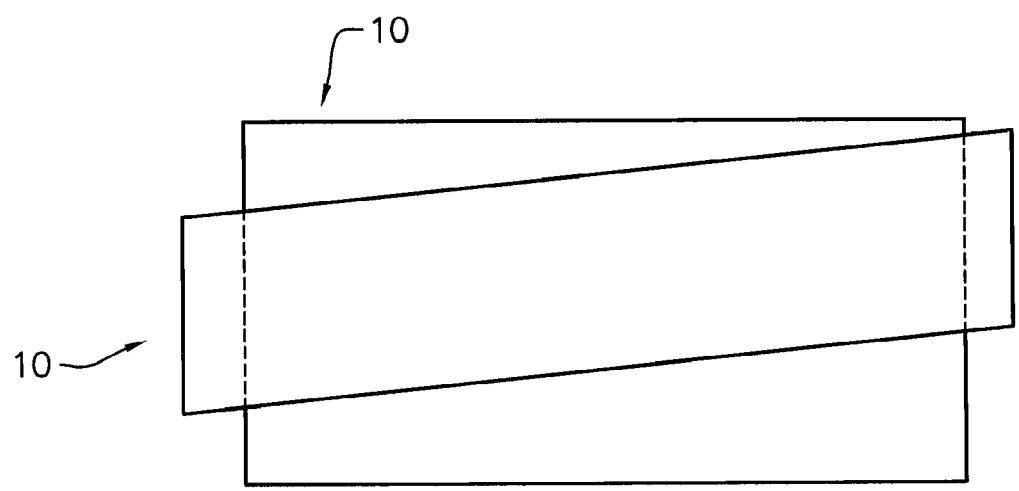
Figure 64:
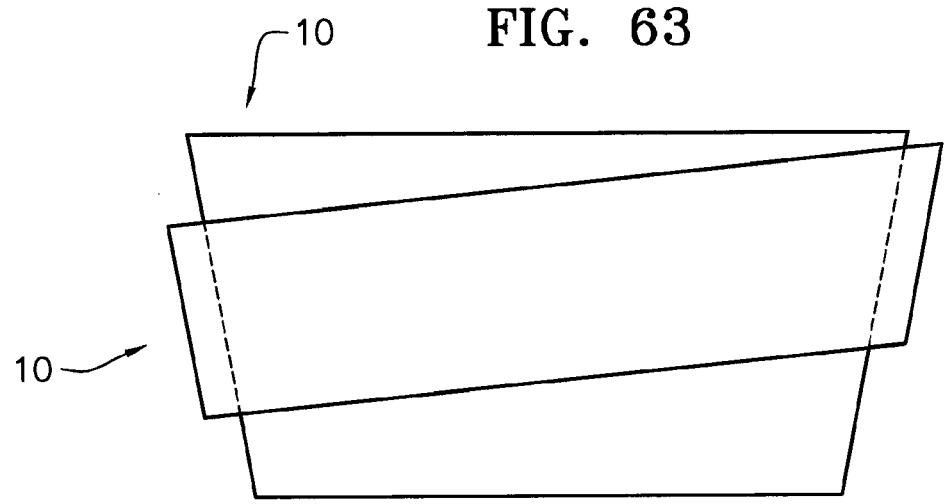
Figure 65:
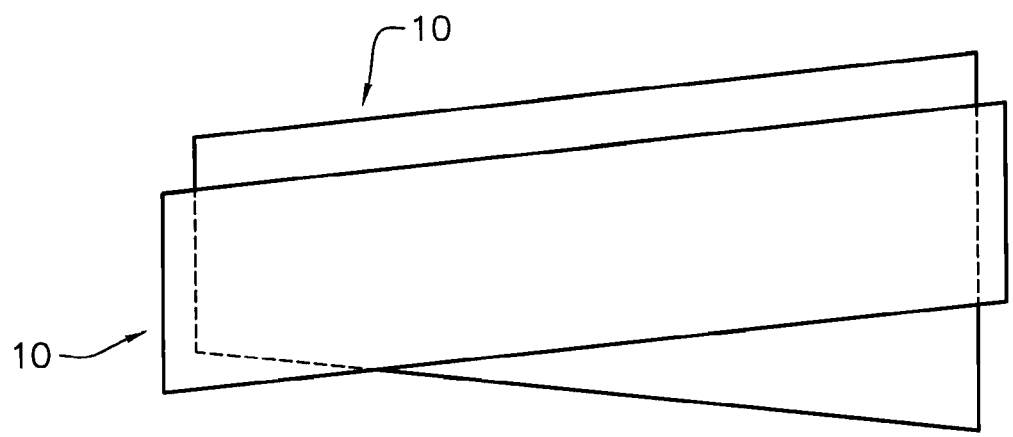
Figure 66:
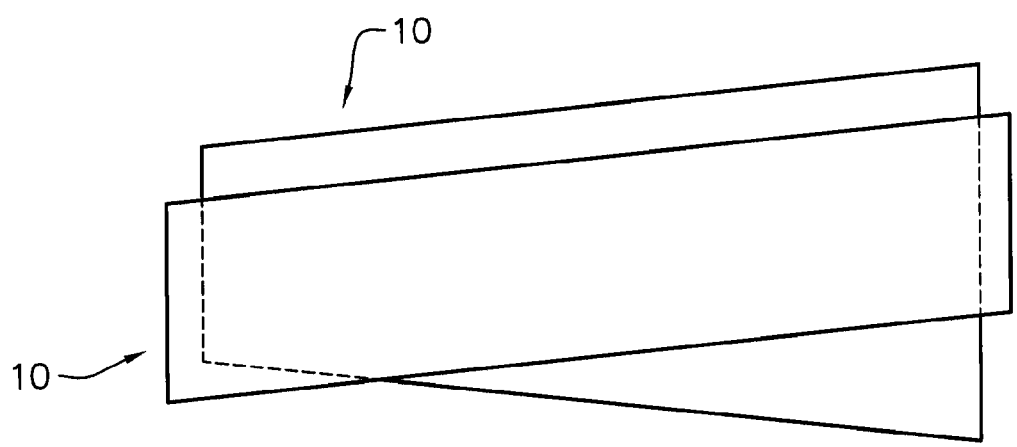
Figure 67:
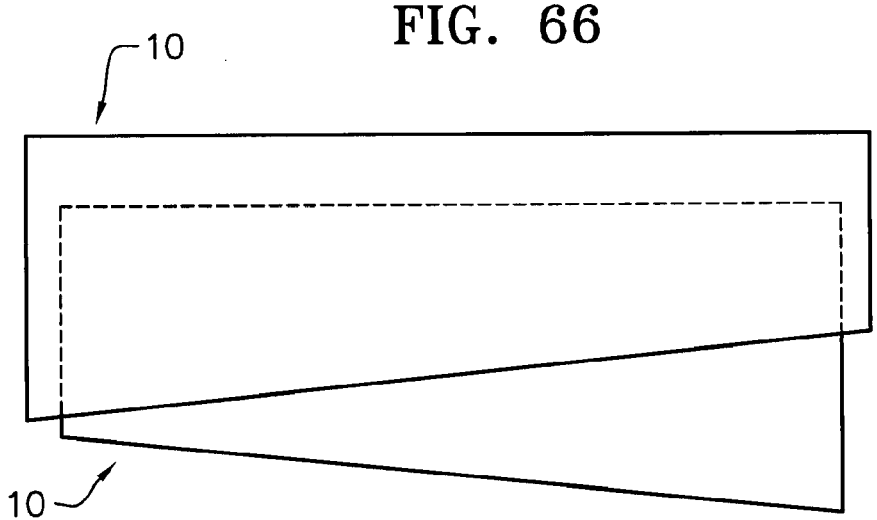
Figure 68:
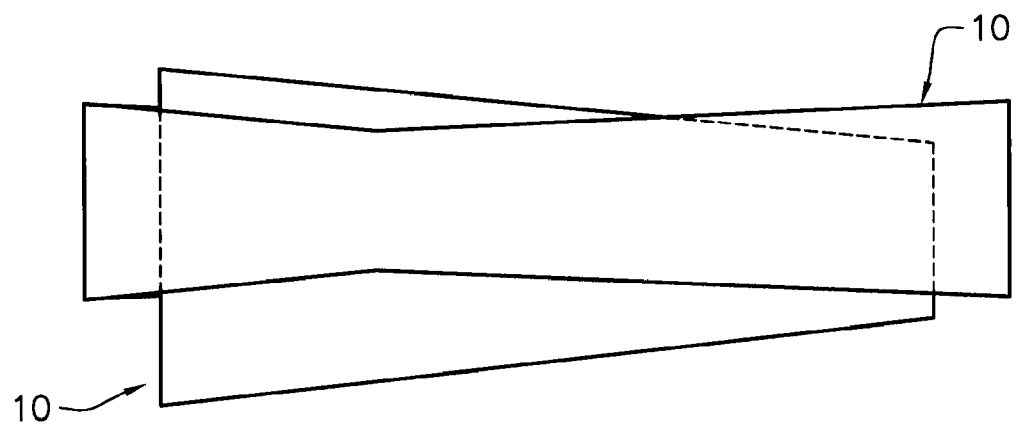
Figure 69:
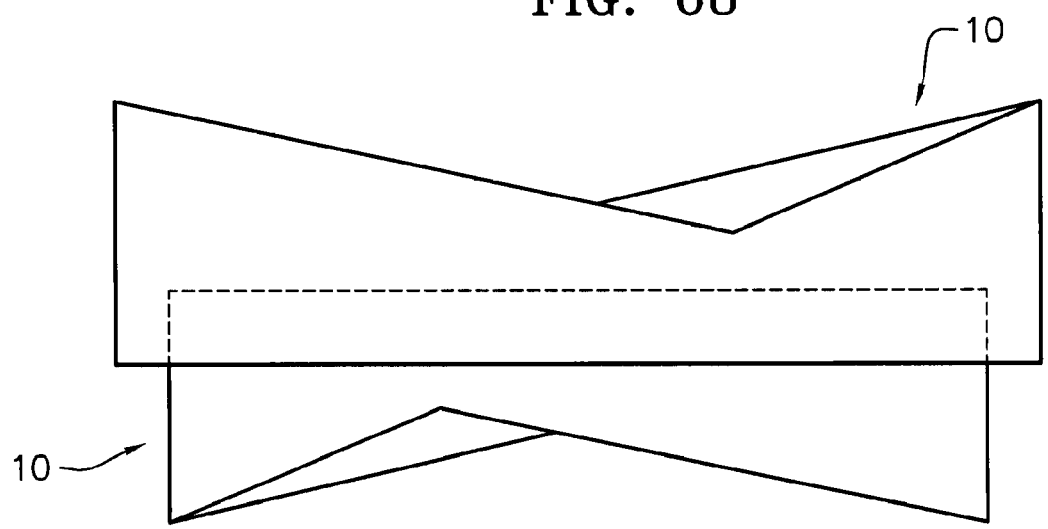
Figure 70:
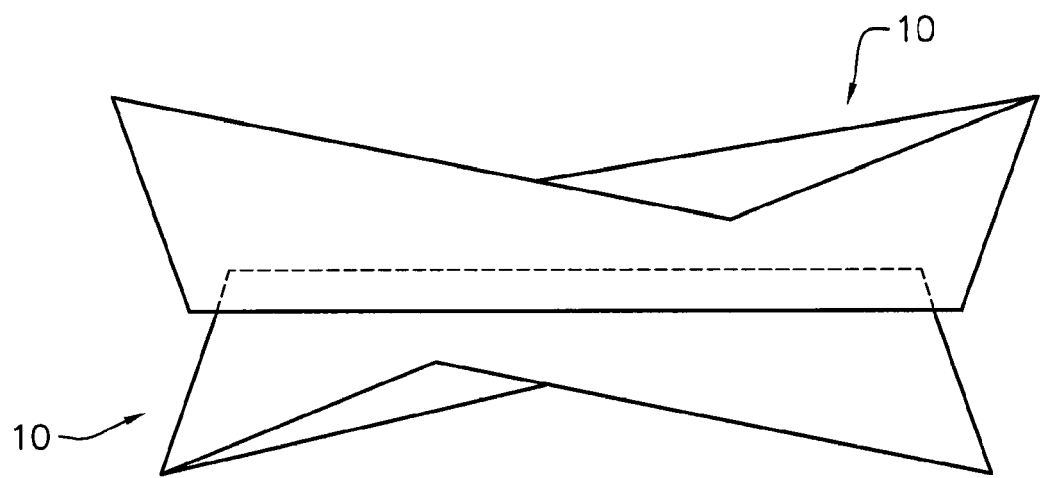

Referring to FIG. 2, as previously identified, the airframe 12 defines the shape of the display system 10 which may be a "two-dimensional" display or a "three-dimensional" display. As used herein, a "two-dimensional" display refers to a display system 10 that may be used, for example, as a backwall that is intended to be viewed from the front side only such that it has a graphic display surface on the front side (e.g., FIGS. 1 and 4-7). Alternatively a two-dimensional display may be used as a panel that is intended to be viewed from two directions such that a graphic display surface is provided on both the front side and the back side. A "two-dimensional" display may be planar or it may be curvilinear on any side, including forming a forwardly curved concave or rearwardly curved convex wall or panel (e.g., FIG. 8). A "three dimensional" display refers to a display system 10 that has a graphic display surface around the entire display or substantially the entire display such that the graphic display can be viewed from all sides (e.g., FIGS. 9 and 10). The three dimensional display may have planar faces or curvilinear faces, including forwardly or rearwardly curving concave or convex faces. Alternatively, the airframe 12 may comprise multiple two-dimensional airframe modules 12' that are connected or attached (as discussed later) to form a three-dimensional display such as illustrated in FIG. 62.

Figure 4:
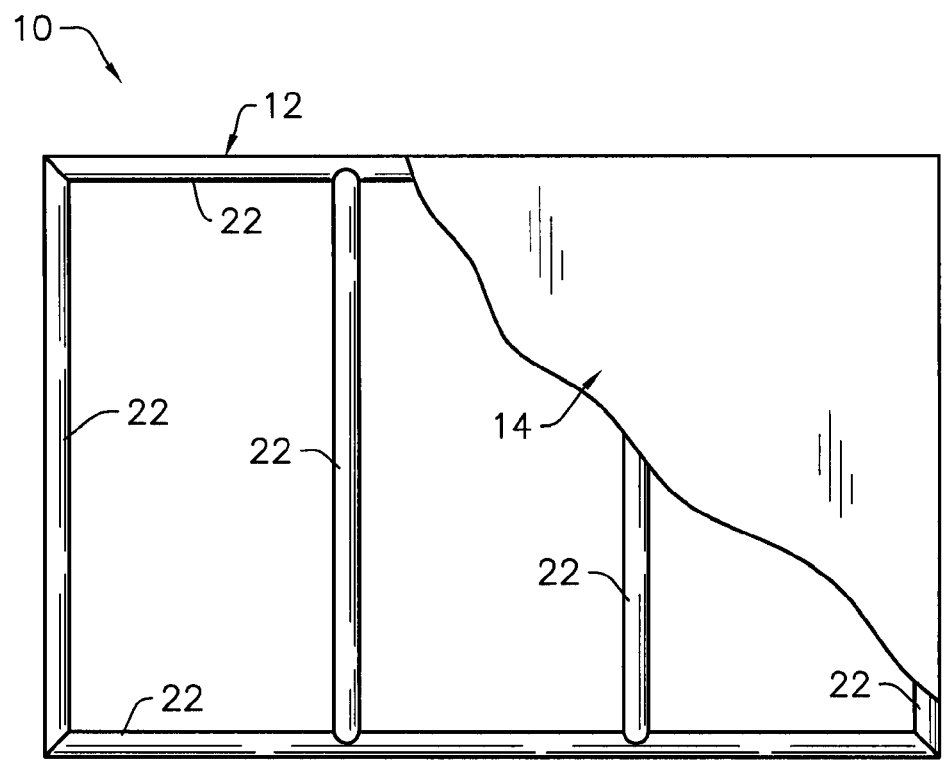
FIG. 4 is a front elevation view of a rectangular airframe display system with a partial cut-away of the cover to show the airbeams of the airframe.
Figure 5:
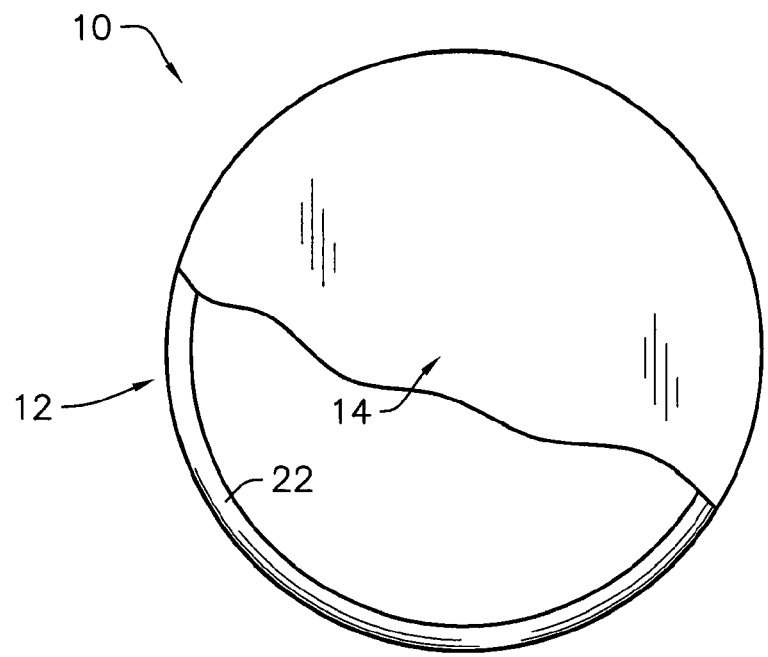
FIG. 5 is a front elevation view of a circular airframe display system with a partial cut-away of the cover to show the airbeams of the airframe.
Figure 6:
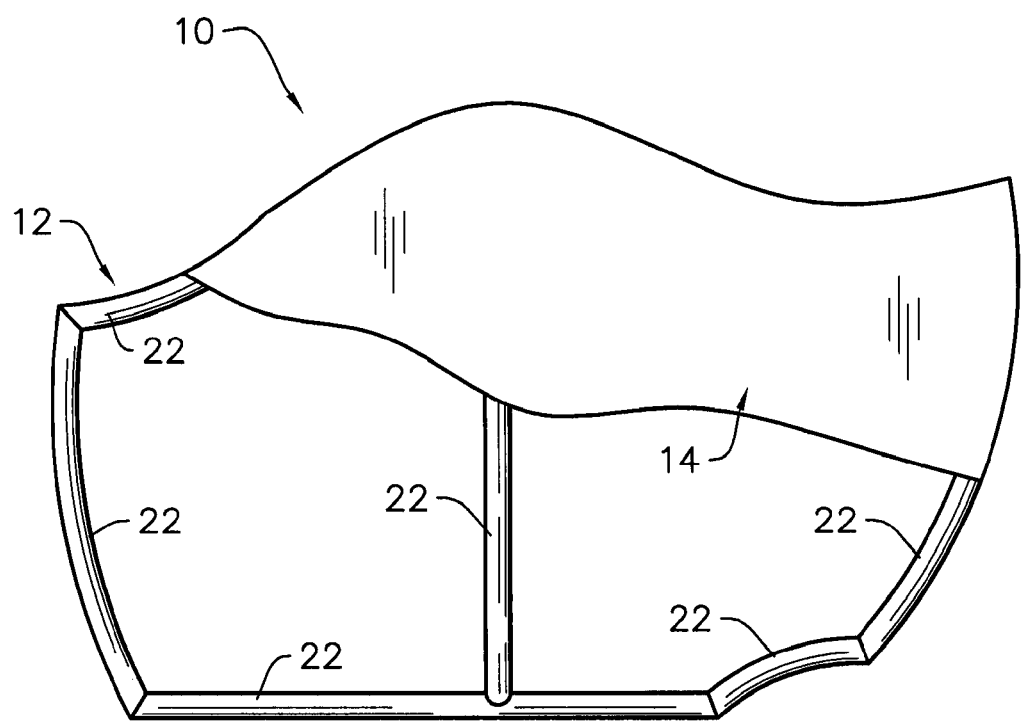
FIG. 6 is a front elevation view of an airframe display system with curvilinear sides with a partial cut-away of the cover to airbeams of the airframe.
Figure 7A:
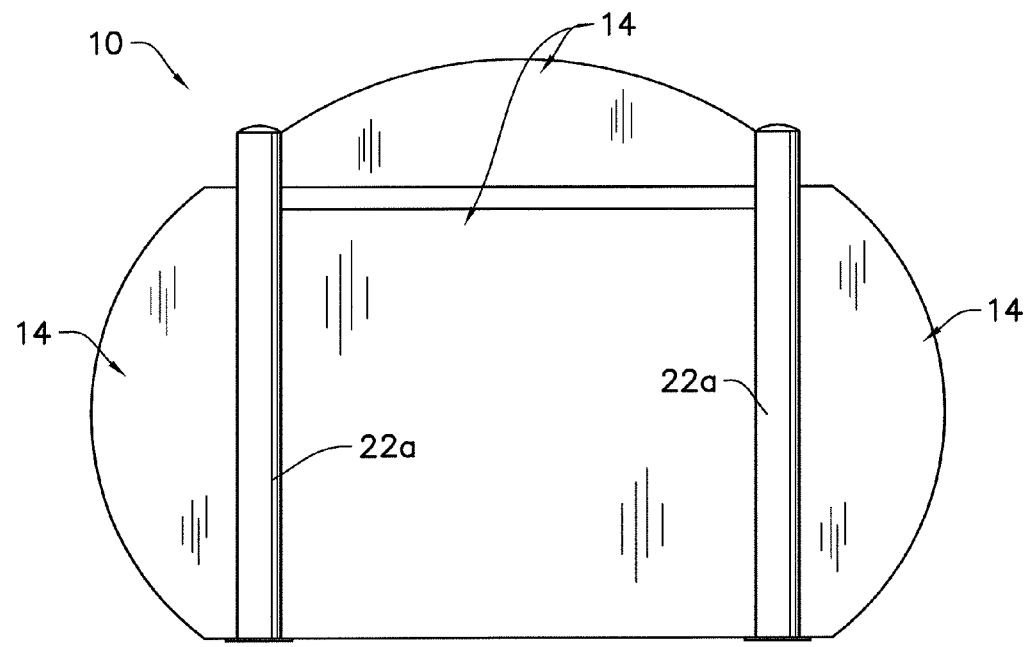
FIG. 7A is a front elevation view of an airframe display system with visible posts and curvilinear sides.
Figure 7B:
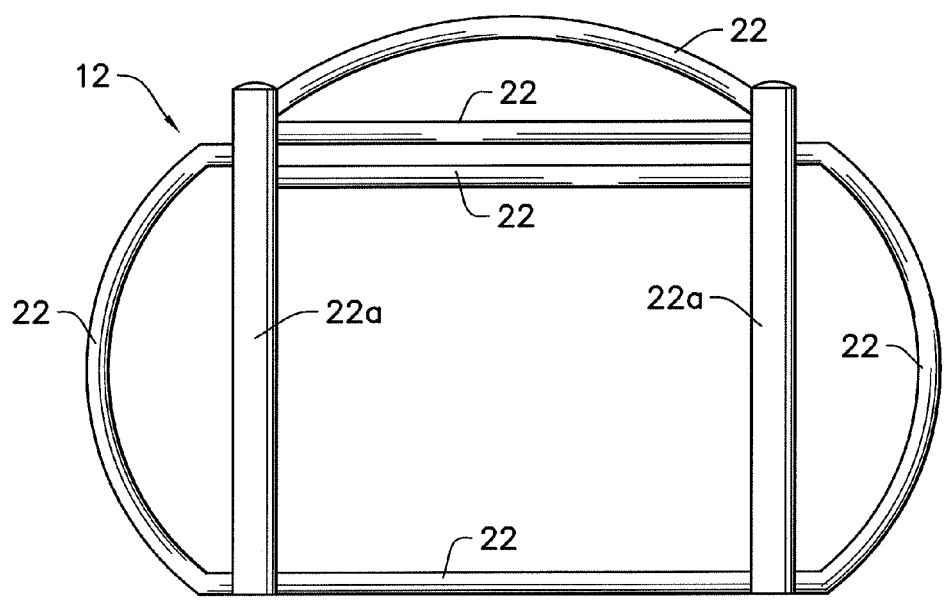
FIG. 7B is a front elevation view of the airframe display system of FIG. 7A with the cover removed to show the internal airbeams.

The airframe 12 and/or the airframe modules 12' may be comprised of a single continuous airbeam 22 (see e.g., FIG. 5) or multiple airbeams 22 (see, e.g. FIGS. 2, 4, 6). The airbeams 22 may be any desired dimension depending on the length or height of the airframe 12 and/or the desired depth for the airframe 12. Additionally, as best illustrated in FIG. 7A-7B, the airframe 12 may include different sized airbeams 22 and the airframe 12 may include exposed airbeams 22a.

The airframes 12 and/or the airbeams 22 include an outer sleeve 24 and an inner air bladder 26. The outer sleeve 24 is constructed of a dimensionally stable material such as nylon or polyester sailcloth that is sewn, bonded or otherwise joined to create the desired shape or configuration of the airbeam 22. The air bladder 26 may be a separate, removable sealed tube-type bladder made of polyurethane or other airtight material that is welded, bonded or otherwise sealed to form an elongated inflatable tube, or the air bladder 26 may be integral with the sleeve 24 by coating the interior or exterior surface area of the sleeve material with a polyurethane coating or other airtight material or otherwise constructing the sleeve out of airtight, dimensionally stable material.

In the embodiment in which an inflatable tube-type air bladder 26 is used, it should be appreciated that the bladder 26 is preferably sized such that it is capable of being inflated to a length and diameter that is greater in length and diameter than the sleeve 24 into which it is inserted, so that when inflated, the inner bladder 26 expands to fully fill the elongated void of the outer sleeve 24. It should be appreciated that because the outer sleeve 24 is preferably made of dimensionally stable material and is preferably smaller in diameter than the diameter to which the tube-type bladder 26 is capable of being inflated, the airbeam 22 becomes quite rigid when the bladder is inflated, even at relatively low pressures of less than 5 psi. It should also be appreciated that the greater the inflation pressure, the more rigid the airbeam will become, but with increased pressures there is also greater likelihood that the bladder 26 and/or the airbeam 22 may burst or leak. It has been found that a pressures between about 5 psi to about 15 psi results in the airbeam 22 and/or the airframe 12 being sufficiently rigid for most display systems 10, but pressures as low as 1 psi to pressures in excess of 30 psi may also be suitable.

Figure 11:
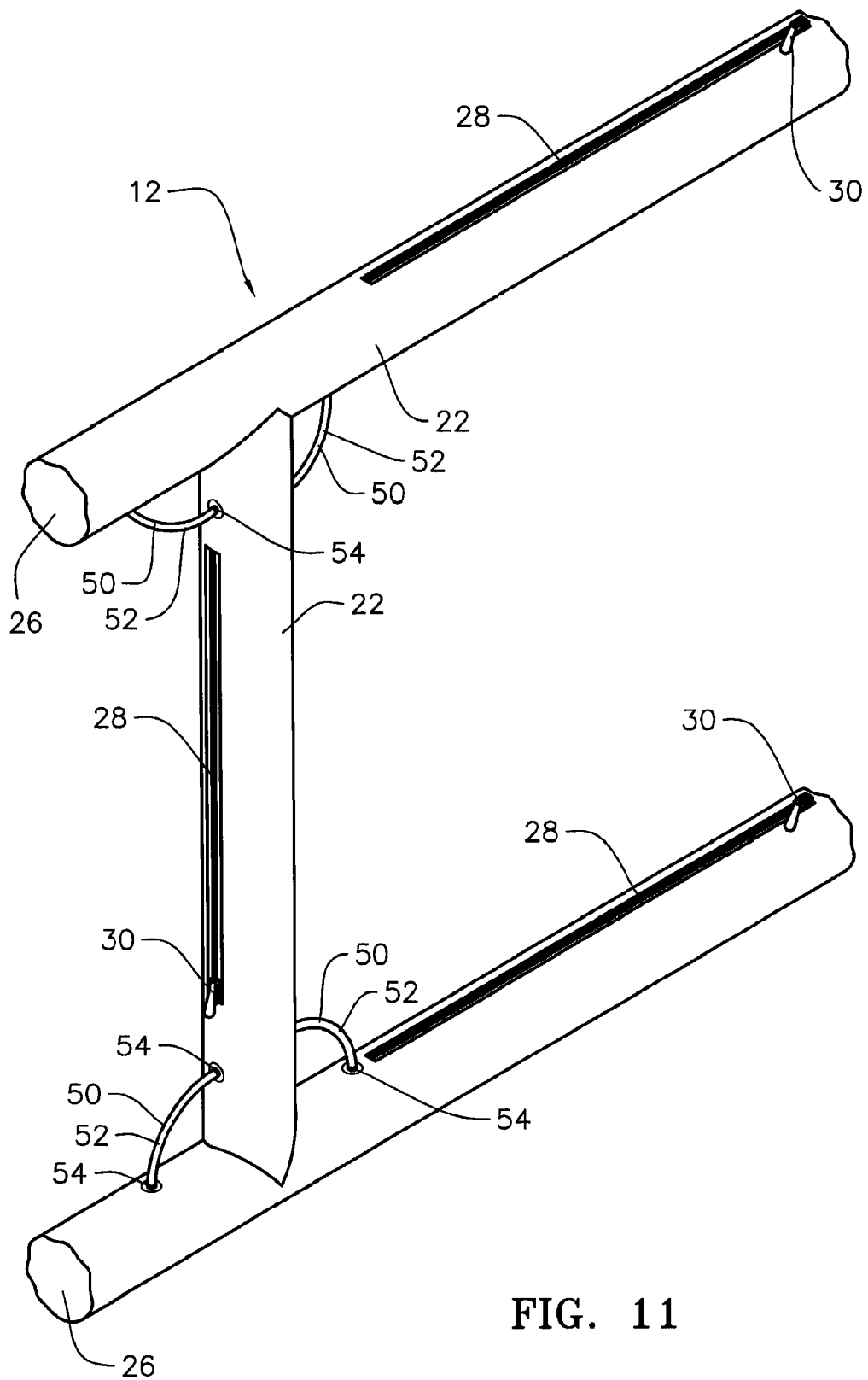
FIG. 11 is an enlarged perspective view of a portion of an airframe illustrating an embodiment of the opening in the sleeves and tubular jumpers.

It should be appreciated that the dimensionally stable sleeve 24 defines the shape of the airbeam 22. Thus, if the desired shape of the airbeam is to be straight or curvilinear, the sleeve 24 is preferably cut and sewn or otherwise fabricated to the desired shape of the airbeam 22 when inflated. In the embodiments which use the tube-type air bladder 26, the sleeves 24 comprising the airbeams 22, preferably includes an opening 28 (FIGS. 2, 11) through which one or more of the tube-type bladders 26 are capable of being inserted and/or removed. A suitable closing means 30 (FIG. 11) such as zippers, Velcro® fasteners, snaps, ties, laces, or any other suitable closing means may be provided to close the opening 28 of the sleeve 24 so the tube-type bladder 26 does not bulge out of the opening 28 when inflated.

Figures 13A, 13B:
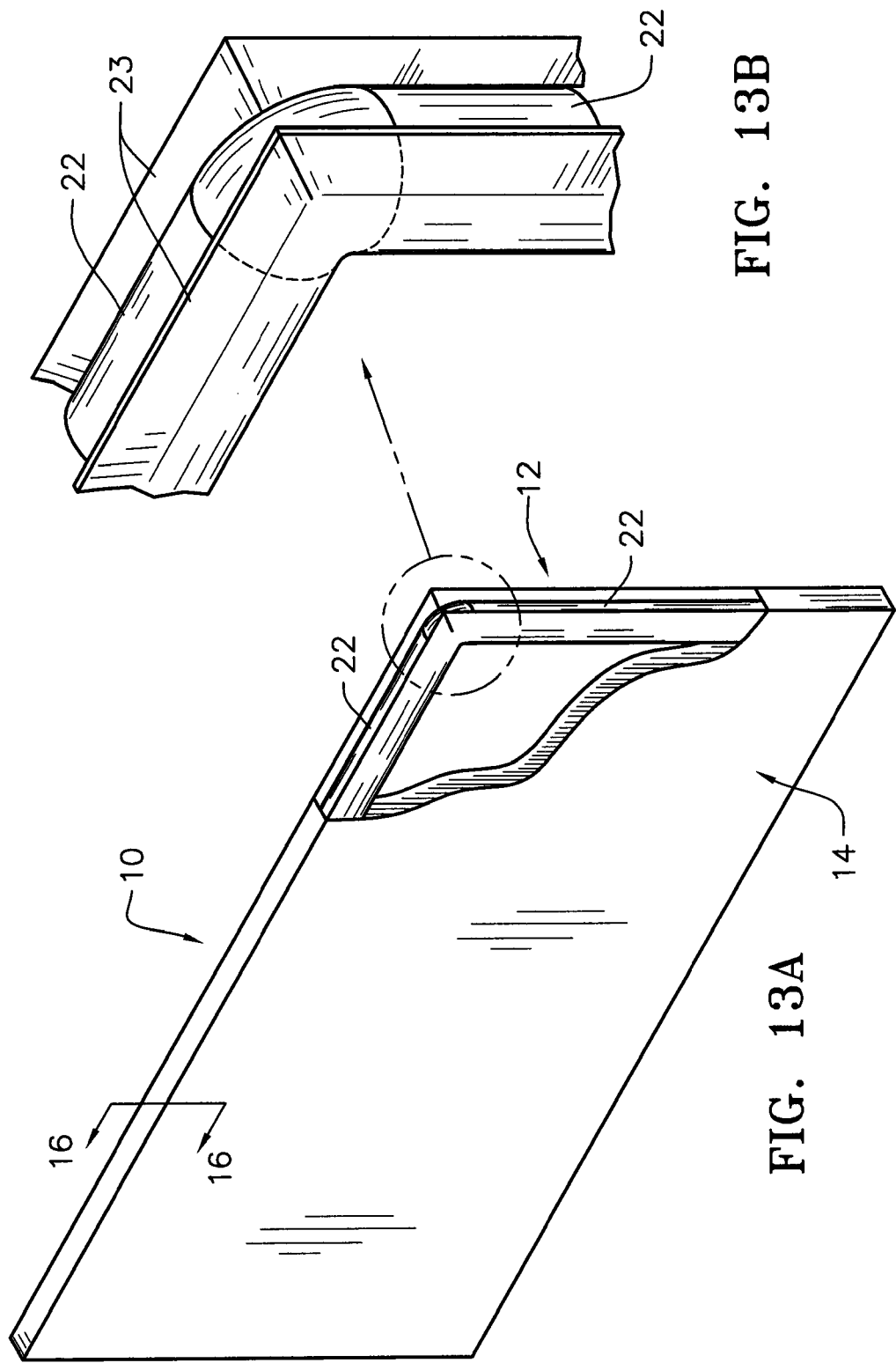
FIGS. 13A-13B are perspective views of another embodiment of a rectangular airframe display system with a partial cutaway of the cover to show an embodiment of a corner detail with right angle corner fins.
Figure 16:
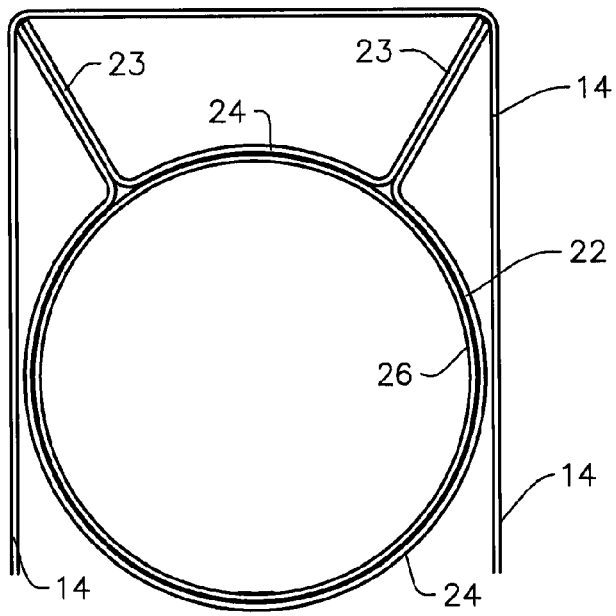
FIG. 16 is a partial cross-sectional view of the airframe display system as viewed along lines 16-16 of FIGS. 13A and 14A.
Figure 17:
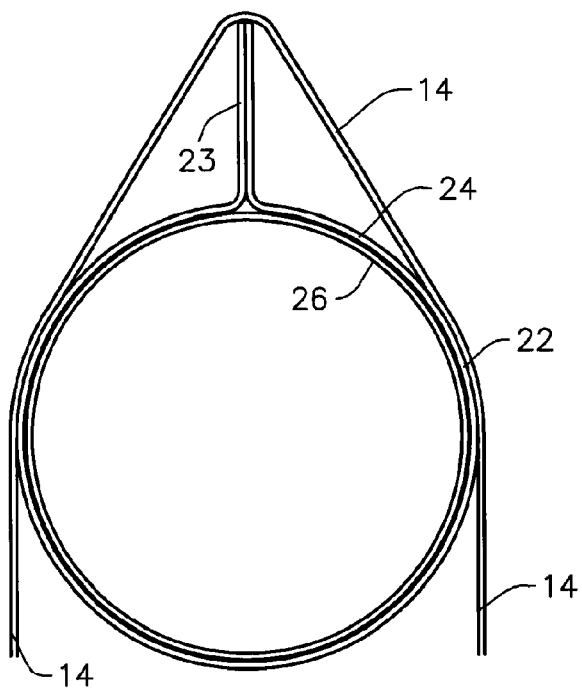
FIG. 17 is a partial cross-sectional view of the airframe display system as viewed along lines 17-17 of FIG. 15A.

With respect to the construction of the airframe 12, the sleeves 24 of intersecting airbeams 22 may be cut and sewn together to form a mitered corner (see FIGS. 12A-12B). The mitered corners provide a sharp corner edge giving the display system a more refined appearance so that it resembles a rigid framed display system. In alternative embodiments, in order to provide more sharp side edges or corner edges, fins 23 may be sewn or otherwise formed into the sleeve 24 and positioned so that the cover 14 is held outwardly from the tubular sleeve 24. For example, two fins 23 may be formed into the sleeve 24 which form right angles at the corners (see, e.g., FIGS. 13A-13B and 16) or a radius at the corners (see, e.g., FIGS. 14A-14B), or a chamfer (not shown) or any other desired corner detail. Additionally, rather than two fins 23, a single fin 23 may be provided as illustrated in FIGS. 15A-15B and 17. Again, at the corners of the display, the single fin embodiments may form a right angle, a radius or chamfer or any other desired corner detail.

Figure 18:
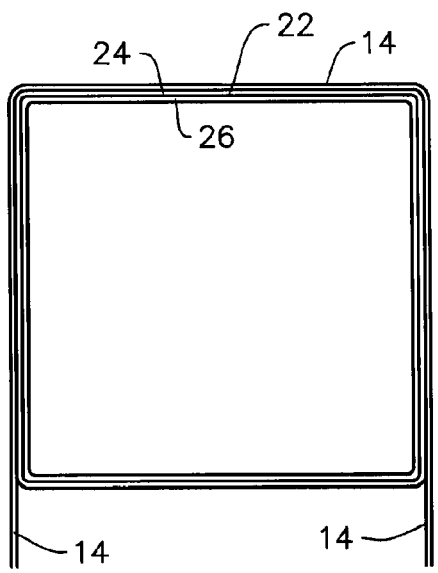
FIG. 18 is a cross-sectional view illustrating an alternative embodiment in which the display system having rectangular airbeams comprising the airframe.

Alternatively, as shown in FIG. 18, the sleeve 24 and bladder 26 comprising the airbeam 22 may be formed into a rectangular shape so that when inflated, the airbeam 22 is rectangular with substantially square corners and parallel sides.

Figure 19A:
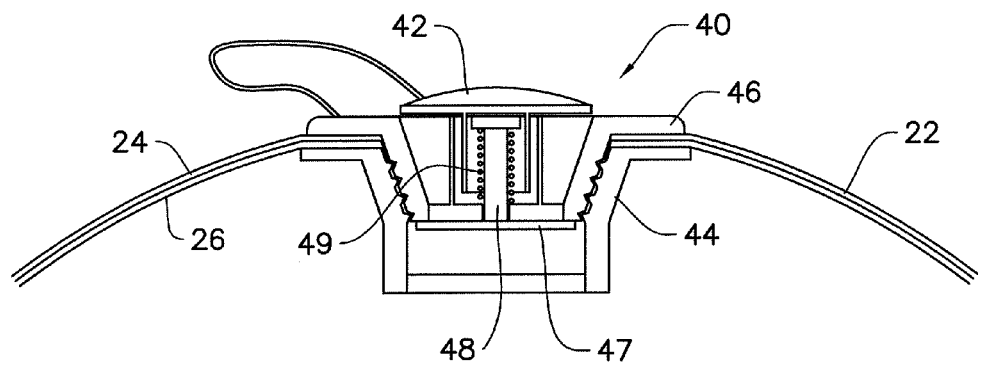
FIG. 19A-19C are partial cross-sectional views of an airbeam showing an embodiment of an air port for inflating and deflating the airframe.
Figure 19B:
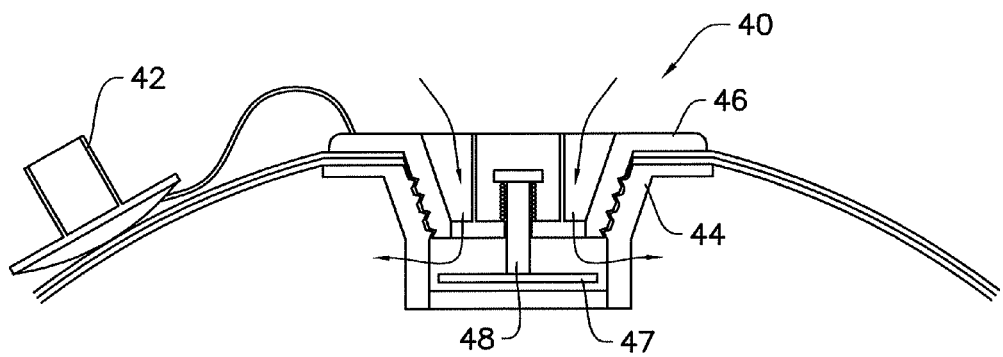
Figure 19C:
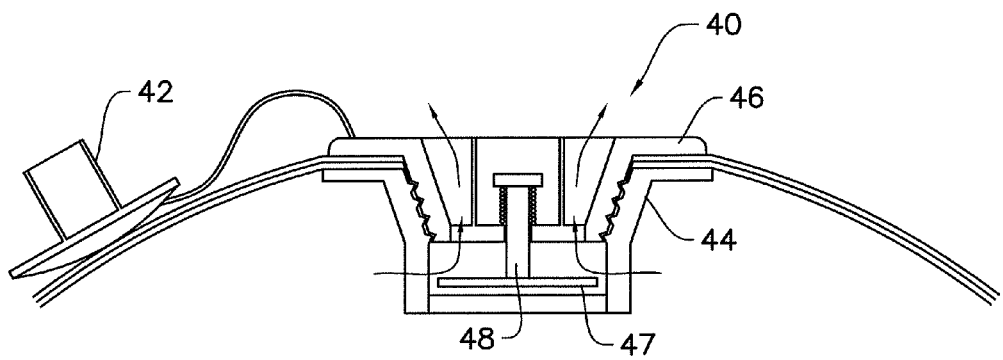

To inflate the airframe, an inflator 60 (discussed later) is connected to one or more air ports 40 (FIGS. 2 and 19) through which air is communicated to the internal air bladder 26 within the dimensionally stable sleeves 24. The air port 40 may be any suitable valve which is preferably adapted to receive an air hose from the inflator 60 for quickly inflating the airframe 12. Alternatively the air port 40 may be adapted to receive a hand pump or foot pump. FIGS. 19A-19C illustrate one embodiment of an air port 40 similar to the air ports found on inflatable boats or rafts. The air port 40 comprises a two part threadably connected body with a removable cap 42. The two part threadably connected body includes a outer valve body 44 which is positioned inside the air bladder 26 below an opening through the airbladder 26 and through the sleeve 24. An inner valve body 46 is threadably received into the outer valve body 44. As the inner and outer valve bodies are threaded together, the bladder 26 and sleeve 24 are pinched between the flanges of the inner and outer valve bodies 44, 46 creating an airtight seal. The inner valve body 46 includes a spring biased plunger-type valve 47 having a valve stem 48 received within a coil spring 49. The valve stem 48 may include cams (not shown) so that when depressed, the valve stem 48 slightly rotates within the inner valve body 46. When the valve stem 48 is released, the cams abut the inner valve body 46 locking the valve 47 in an open position. When valve stem 48 is depressed again, the cams cause the valve stem 48 to again rotate allowing the valve 47 to seat in the closed position.

It is desirable for the air ports 40 to have a sufficiently large volumetric capacity so that the entire display can be quickly inflated and deflated. For example, for a ten foot backwall airframe display 10 (such as illustrated in FIG. 1), in which the airframe 12 is inflated to a pressure of about 11 psi, for example, the air port 40 will preferably have a sufficient volumetric capacity to deflate the airframe 12 to a pressure of about 1 psi in about ten seconds at which pressure the airframe 12 will typically collapse. Using the ten foot backwall airframe display as an example, because pressure is proportional to velocity squared, and again assuming the airframe 12 is inflated to a pressure of about 11 psi, upon opening the valve 47 of the air port 40, it can be calculated that air will escape the air port at about 114 cubic feet per minute (cfm). An air port 40 that has been found to be suitable for an airframe display system which provides such volumetric capacity is a Scoprega/Ningbo Bravo (Milan, Italy) model no. 2005. Furthermore, after the collapsed airframe 12 is being gathered up for storage in a storage case or into a compression sack (discussed later) a large volumetric capacity air port allows the remaining air within the airframe 12 to be more quickly expelled such that the airframe may be more quickly and efficiently compressed into a smaller volume.

Figure 20:
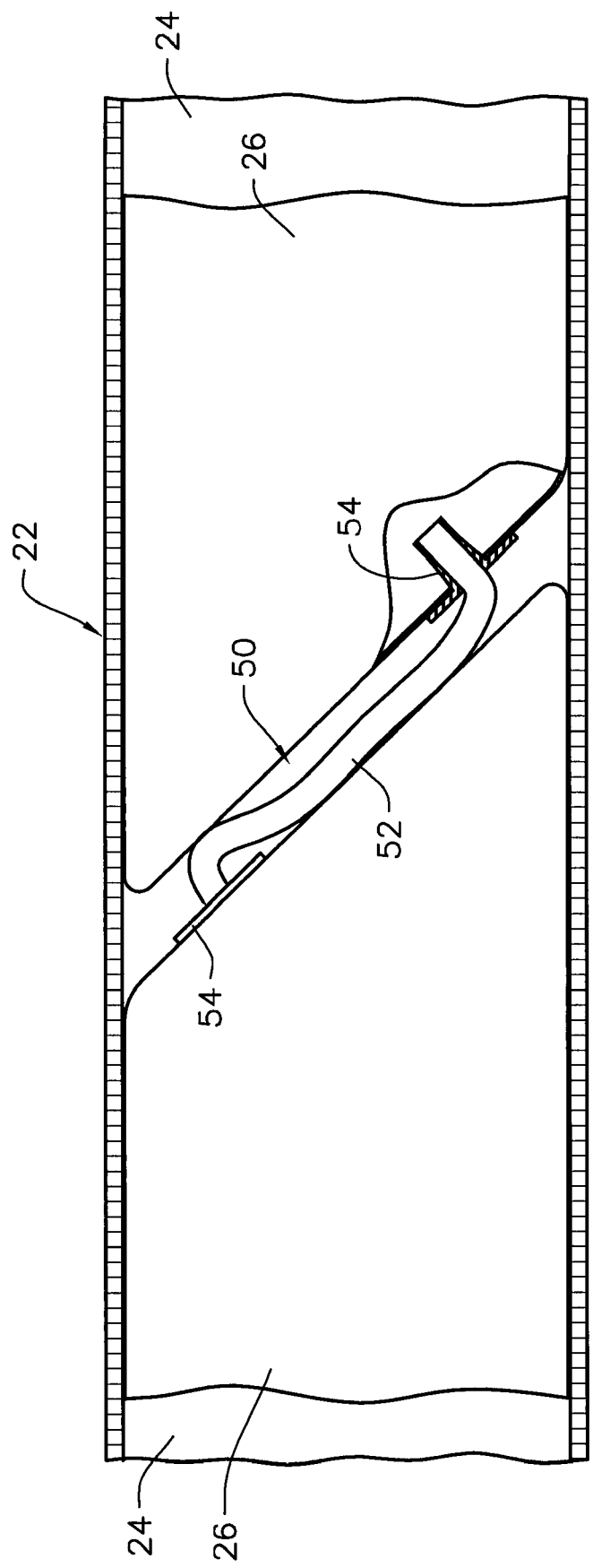
FIG. 20 is an enlarged partial cutaway view of an airbeam illustrating an internal tubular jumper to fluidly connect tube-type bladders.

For convenience in set up and take down of the airframe display system 10, it may be desirable to have a single air port 40 to inflate and deflate the entire airframe 12. In such an embodiment, as illustrated in FIG. 2, tubular jumpers 50 are provided to fluidly connect the air bladders of the intersecting beams 22 comprising the airframe 12. Similarly, for airbeams 22 having the tube-type air bladders 26, it may be desirable to have tubular jumpers 50 connecting the bladders internally within the sleeve (see FIG. 20). By using internal tubular jumpers 50 to fluidly connect the tube-type bladders 26, the tube bladders may be fabricated in standardized lengths (such as four, six or eight foot lengths) which can then be joined together by the tubular jumpers 50, for insertion into the sleeves. For example, if an airbeam 22 is has a twelve-foot length, then three four-foot tube bladders or two six-foot tube bladders may be inserted into the sleeve 24 of the airbeam 22 with the bladders fluidly connected by internal tubular jumpers 50. Such an arrangement will permit the replacement of a single tube-type bladder section within the sleeve 24 of an airbeam 22 if one section is punctured or begins to leak rather than replacing an entire tube bladder fabricated to match the length of the airbeam 22. Referring to FIG. 20, the tubular jumpers 50 may comprise a flexible tube 52 extending between stems 54 in adjacent tube-type bladders 26a, 26b internally of the sleeves 24 and/or them stems 54 projecting through the sleeves 24 of intersecting airbeams 22. The stems 54 are designed to securely hold the ends of the flexible tube 52 so that, once connected, the tube 52 does not inadvertently disconnected from the stem 54 causing the airframe 12 to deflate.

While multiple internal tube-type bladders 26 may be used in a single airbeam 22, it has been found that where two beams intersect (such as at a corner) it is desirable to close off the ends of the intersecting beams with an internal wall (not shown) to prevent bladder "creeping" from one beam to another.

The inflator 60 (FIG. 2) is preferably an electric air pump, but a compressed air tank or a hand pump or foot pump may also be suitable. The electric air pump may be powered by an AC power supply or DC power supply, such as a 12 volt DC battery, for portability or when an AC power supply may not be readily available. It may be desirable to use the electric air pump to withdraw or evacuate the air from the airframe to more quickly deflate the airframe 12. Thus, it may be desirable to utilize an air pump inflator that allows the air hose used to connect to the air port 40 to be swapped between an air inlet of the pump and the air outlet of the pump. The air pump may be a single stage or a two stage pump. For most displays, a single stage pump should be suitable. For very large displays, a two stage blower and piston pump such as the BTP12 Manometer pump available from Scoprega/Ningbo Bravo, Milan, Italy may be desirable. A two stage pump may be desirable because the first stage blower is used to quickly fill the airframe 12 with air at a low pressure (up to approximately 3 psi) after which the second stage piston pump is automatically actuated to bring the pressure in the airframe 12 up to the desired airframe pressure such as 11 psi. When the desired airframe pressure is reached, the pump preferably automatically stops pumping.

Figure 21:
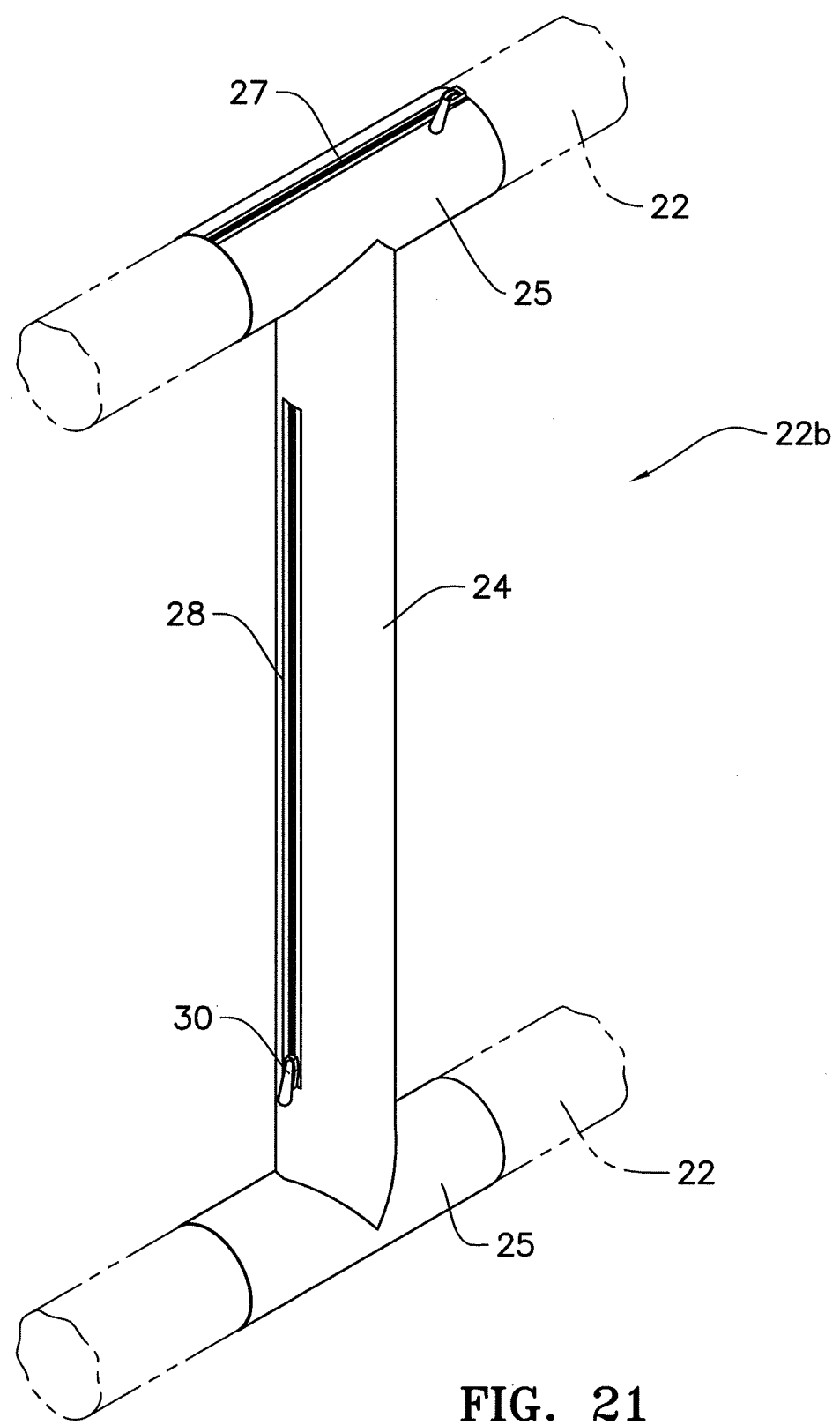
FIG. 21 is an enlarged perspective view of a removable airbeam with attaching sleeves.

FIG. 21 is a perspective view of an embodiment of a removable airbeam strut 22b which may be used with any two-dimensional or three-dimensional display system 10. As with the other above-described airbeams 22, the removable airbeam strut 22b comprises a sleeve 24 and bladder 26 as previously described. At the upper and lower ends of the airbeam strut 22b is a connecting sleeve 25 that is made of the same material as the sleeve 24. The connecting sleeve 25 includes a closing means 27, such as a zipper, Velcro fasteners, snaps, ties, lacing, etc., and is preferably sized so that when closed by the closing means 27 it is the same diameter as the beam 22 to which it is to be connected so that when the airbeam 22 is inflated, the connecting sleeve 25 does not slide along the inflated airbeam 22. If the removable airbeam strut 22b includes a tube-type bladder, the strut 22b preferably includes a similar opening 28 and closing means 30 in the sleeve 24 as previously described for inserting and/or removing the tube-type bladder 26 if it becomes punctured. The removable airbeam strut 22b may include a separate air port as previously described or it may include stems 54 for receiving the tubular jumpers 50 to fluidly connect the bladder of the removable strut 22b to the bladder of an interesting airbeam 22.

Figure 22A:
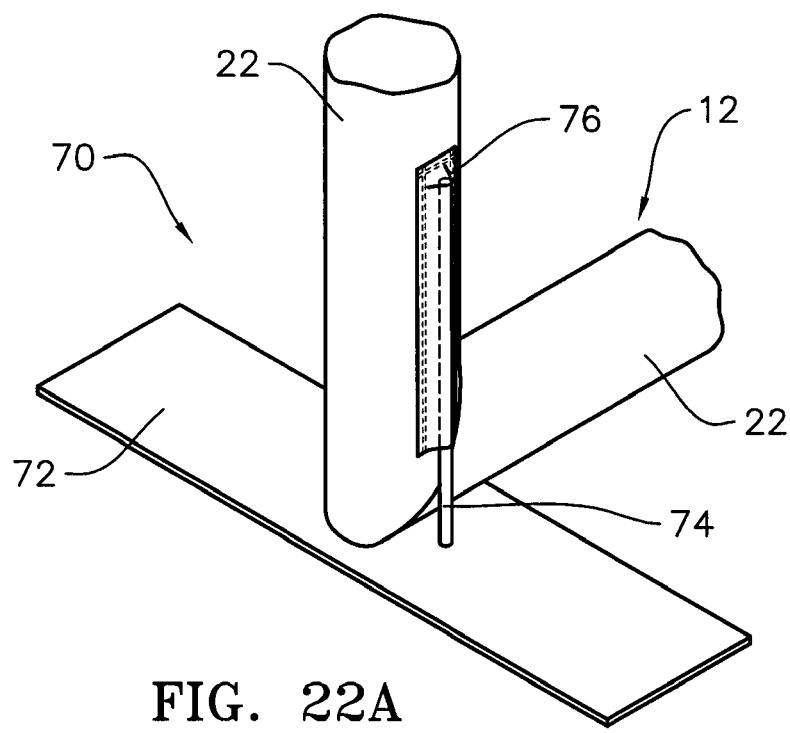
FIGS. 22A-22B show a perspective view of an embodiment of a foot assembly for supporting an airframe display.
Figure 22B:
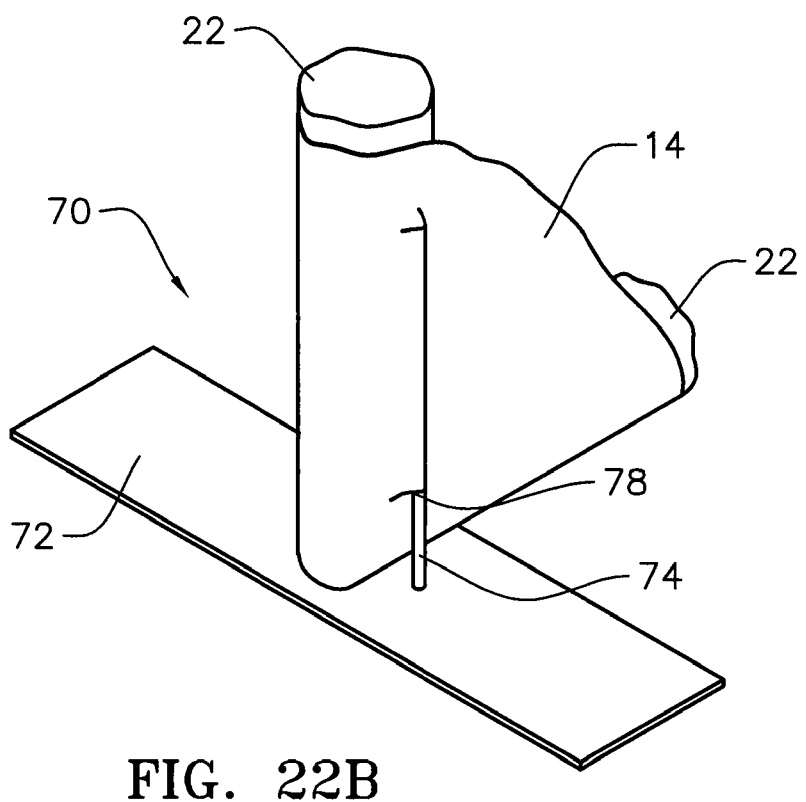

FIGS. 22-23 illustrate embodiments of foot assemblies 70 to provide stability to the airframe display system 10 when it is placed on a floor surface. In the embodiment of FIGS. 22A-22B, the foot assembly 70 comprises a substantially planar base 72 and a vertical rod 74. The vertical rod 74 is received within a pocket 76 stitched or otherwise bonded to the sleeve 24 of the airframe 12. The pocket 76 is preferably made of the same material as the sleeve 24 and is preferably sized to snuggly receive the rod 74. FIG. 22B shows the same corner of the airframe display 10 of FIG. 22A, but with the cover 14 disposed over the airframe 12. The cover 14 includes a small opening 78 through which the rod extends before it is received by the pocket 76.

Figure 23A:
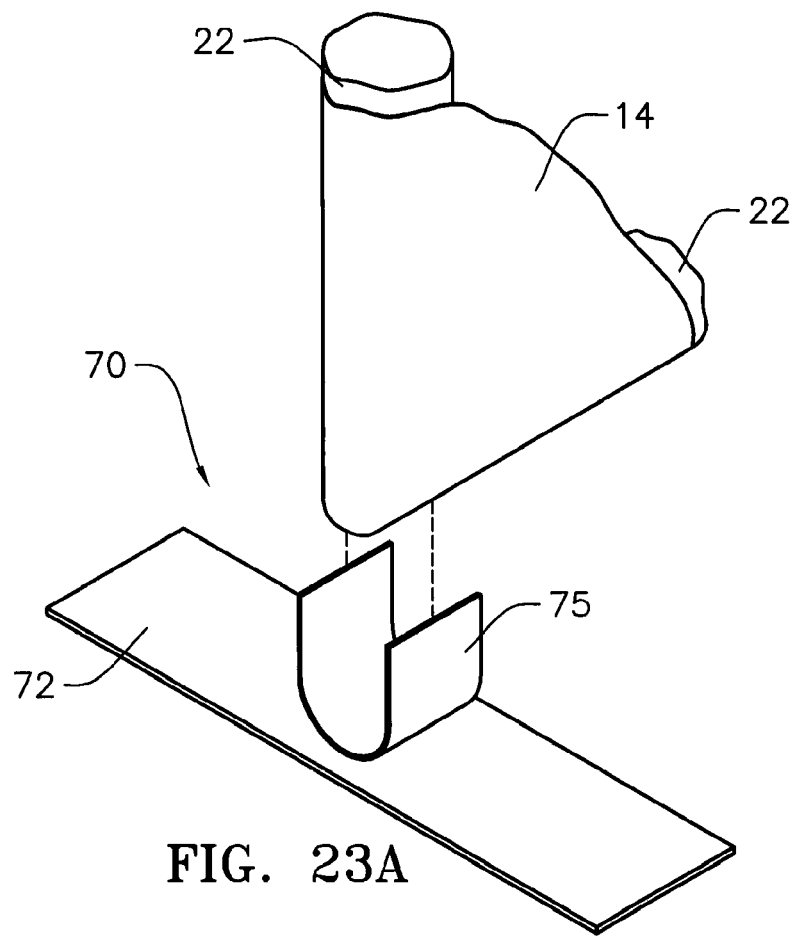
FIGS. 23A-23B show a perspective view of another embodiment of a foot assembly for supporting an airframe display.
Figure 23B:
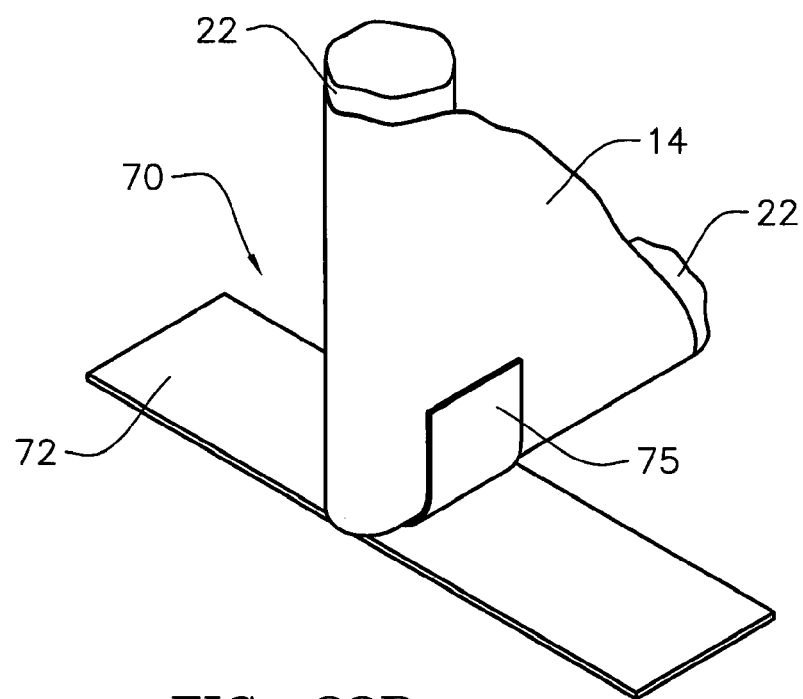

FIGS. 23A-23B illustrate an alternative embodiment of the foot assembly 70. In this embodiment, the foot assembly 70 includes a substantially planar base 72 to which is secured a U-shaped saddle 75 sized to receive the bottom airbeam 22 of the airframe 12. In this embodiment, the bottom airbeam 22 with the cover 14 is received in the saddle 75 such that it is not necessary to create a small opening in the cover for attaching the foot assembly as in the previous embodiment.

Figure 24:
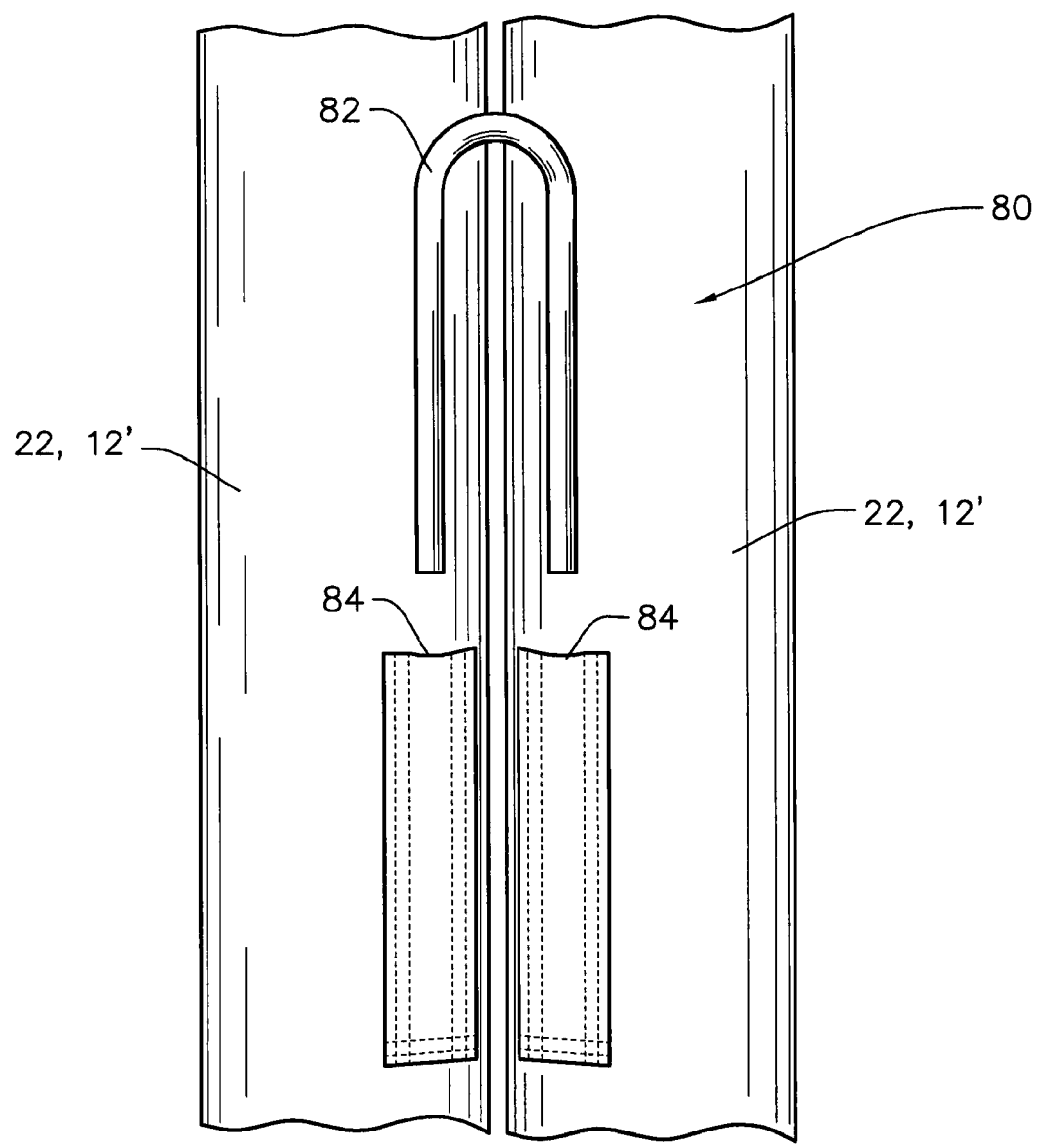
FIG. 24 is an elevation view showing an embodiment of a parallel connector assembly for connecting parallel airbeams.

In some applications it may be desirable to connect together two separate display systems 10 (each having their own airframe 12 and cover) end-to-end or it may be desirable to connect two parallel airbeams or airframe modules 12' end-to-end which are then received within a single cover 14. FIG. 24 illustrates one embodiment of a parallel connector assembly 80 for connecting aligned ends of an airframe 12 or airframe modules 12' together. The parallel connector assembly 80 comprises a U-shaped connector 82 having ends which are inserted into aligned pockets 84 stitched or otherwise bonded to the airbeams 22 of adjacent airframes 12 or airframe modules 12'. The pockets 84 are preferably made of the same material as the sleeve 24 of the airbeams 22 and the pockets 84 are preferably sized to snuggly receive the ends of the U-shaped connector 82. It should be appreciated that if two display systems 10 with each display system having its own cover 14, then the covers 14 would include a small opening through which the ends of the U-shaped connector 82 extend before being received by the pockets 84. However, if two or more airframe modules 12' are connected together first and then a single cover 14 is placed over joined airframe modules 12', then the cover 14 need not have small openings to receive the U-shaped connector.

Figure 25:
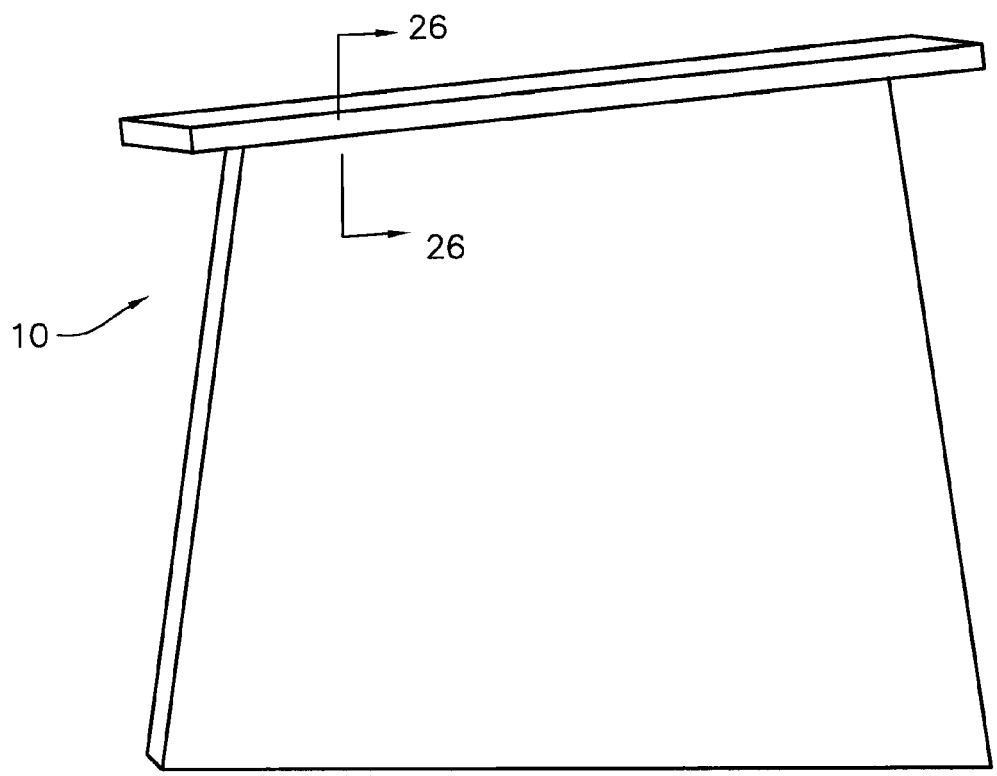
FIGS. 25-26 illustrate a corner connector assembly for attaching a cantilevered airframe to a backwall airframe display.
Figure 26:
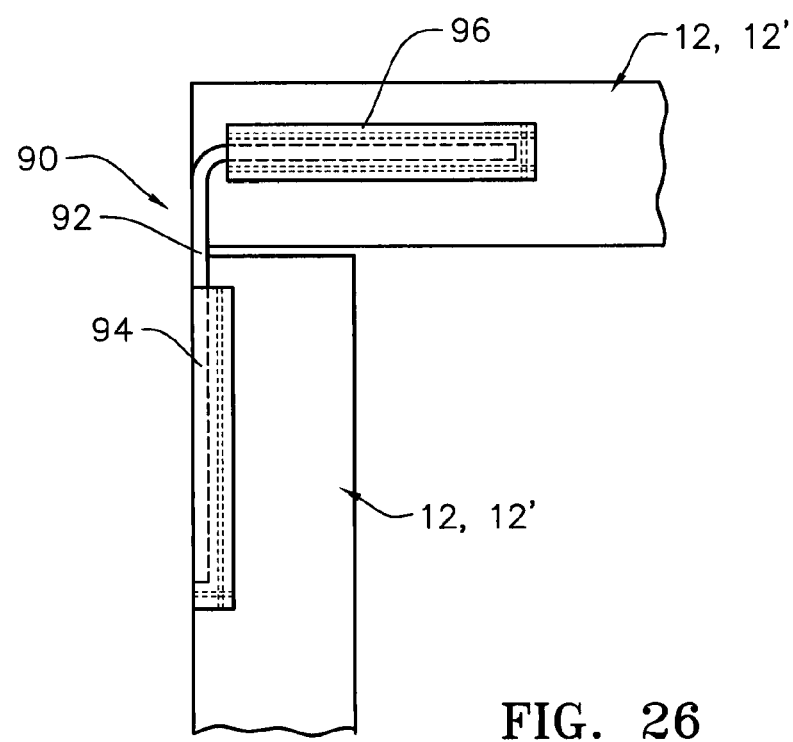

FIGS. 25-26 illustrates a corner connector assembly 90 which may be used, for example, to connect a cantilevered airframe module 12' to a vertical airframe 12 of a two dimensional display 10. The corner connector assembly 90 comprises an L-shaped connector rod 92 for connecting the intersecting airframes 12 together. The L-shaped connector rod 92 may have a ninety degree bend as shown or it may have an obtuse or acute angle bend. As with the parallel connector assembly, one end of the L-shaped connector rod 92 is received within a pocket 94 stitched to the sleeve 24 of one of the airframes 12. The other end of the L-shaped connector rod 92 is received within another pocket 96 stitched to the sleeve 24 of the other airframe 12. The pockets 94, 96 are preferably made of the same material as the sleeve 24 and are preferably sized to snuggly receive the ends of the L-shaped connector rod 92. It should be appreciated that the cover 14 would include a small opening through which the ends of the connector rod 92 extend before being received by the pockets 94, 96.

Figure 27:
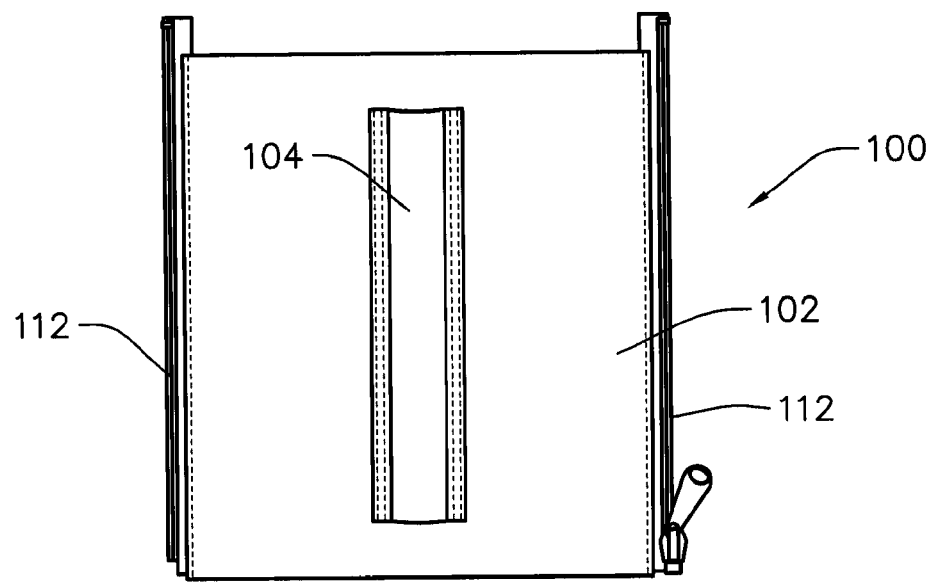
FIGS. 27-28 illustrate an embodiment of an accessory mount for supporting a bracket for mounting an accessory to an airframe display.
Figure 28:
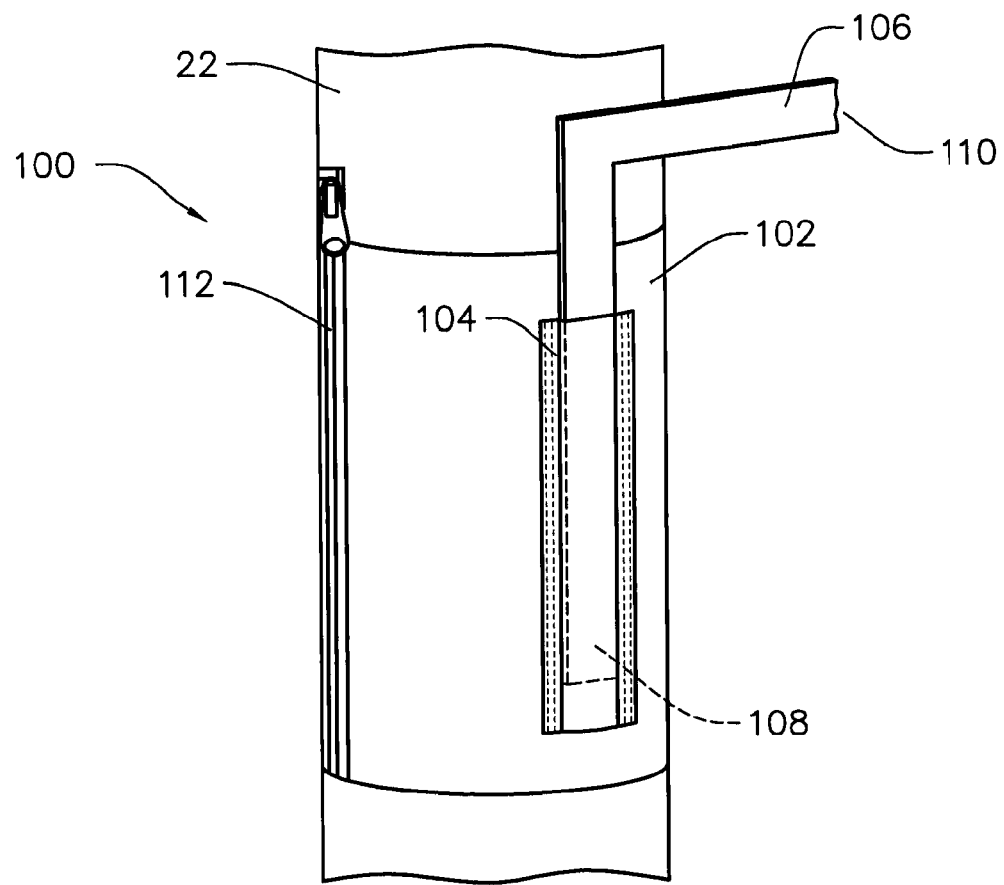

FIGS. 27-28 illustrate an embodiment of an accessory mount 100. In this embodiment, the accessory mount 100 comprises an attachment sleeve 102 for attaching to an airbeam 22 of an airframe 12 for purposes of attaching other components, such as a monitor, shelves, other airframe displays, etc. The attachment sleeve 102 may include a pocket 104 for receiving a bracket 106. The bracket 106 has a sleeve insert end 108 and an accessory mount end 110. The attachment sleeve 102 is preferably made of the same material as the sleeve 24 of the airbeam and includes a suitable closing means 112, such as a zipper, Velcro® fasteners, snaps, ties, lacing, etc., and is preferably sized so that when the attachment sleeve 24 is zipped or otherwise closed by the closing means 112 it is the same diameter as the airbeam 22 to which it is to be connected so that when the airbeam 22 is inflated, the attachment sleeve 102 does not move with respect to the inflated airbeam 22. The accessory mount end 110 of the bracket 106 may have any of various types of accessory connectors (not shown) depending on the accessory to be mounted. For example the accessory connector may be a simple plate, a threaded connector to which a monitor or shelf may be bolted, threaded or otherwise attached. It should be appreciated that a similar attachment sleeve with pockets may be used for the parallel connector assembly 80 and/or for the corner connector assembly 90.

Figure 29:
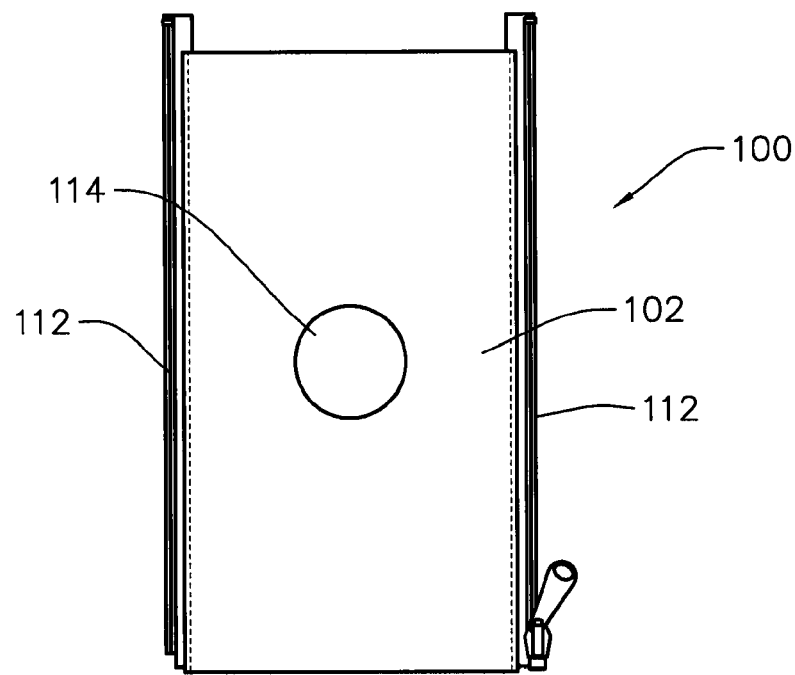
FIGS. 29-30 illustrate another embodiment of a magnetic accessory mount for magnetically supporting an accessory to an airframe display.
Figure 30:
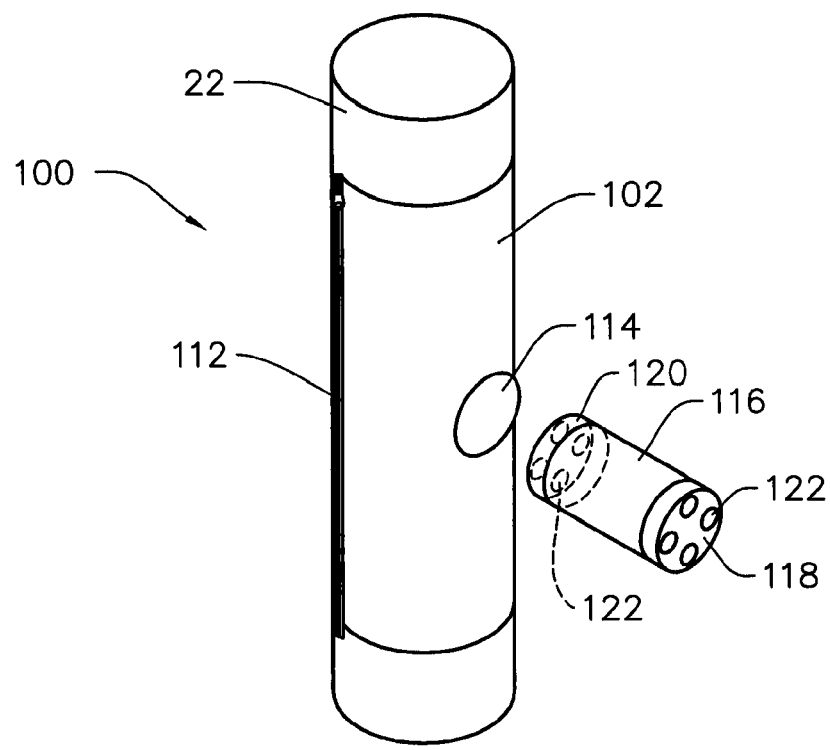

FIGS. 29-30 illustrate another embodiment of an accessory mount 100 that is magnetic. In this embodiment the accessory mount 100 includes an attachment sleeve 102 with a suitable closing means 112 such as a zipper, Velcro® fasteners, snaps, ties, lacing, etc., as described in connection with the embodiment of FIGS. 27-28 for purposes of attaching other components, such as a monitor, shelves, other airframe displays, etc. However, in this embodiment, rather than a pocket secured to the attachment sleeve 102, a steel plate 114 is secured to the attachment sleeve 102. The accessory mount 100 in this embodiment also includes a spacer member 116 which may be in the shape of a cylindrical tube or any other desired shape, with a length and width depending on the amount of offset desired between the airframe and the accessory and the weight of the accessory to be mounted. The spacer member 116 has first and second end caps 118, 120 each having a plurality of magnets 122 seated in the end caps. As shown in FIG. 30, the first magnetic end cap 118 magnetically attaching to the metal plate 114 secured to the attachment sleeve 102 secured to the airbeam 22 of the airframe 12. If the accessory to be mounted to the spacer member 116 is itself metal, such as for example a metal shelf bracket or a metal monitor mounting plate, then the second magnetic end cap 118 may magnetically attach to the accessory.

FIGS. 31A-31D illustrate an embodiment of a compression sack 140 which may be used to tightly compress the airframe display system 10 into a tight bundle so it will take up less space during storage or transport. The compression sack 140 comprises a wear resistant fabric bag 142 with a draw string 144 around its opening 146. Rigid side panels 148 are disposed on the inside bottom periphery of the bag 142 in order to provide a rectangular configuration to the bottom of the bag 142. The rigid side panels 148 may be omitted if desired. The size of the bag 142 and side panels 148 may vary depending on the size of the airframe display to be stowed therein and whether it is desirable to meet airline canyon-on baggage size limits. Levers 150 are hingedly secured to the outside of the bag 142, proximately in the middle of each of the rigid side panels 148. Straps 152 are secured to each of the levers. The straps 152 may be secured at different positions along the levers 150 to vary the leverage achieved by each of the levers 150 as they are pivoted downwardly as described later. The ends of the straps 152 include cooperating elements of a connector 154, such as a side-release buckle or any other suitable connector. The connector 154 also preferably includes a strap length adjuster to permit the strap lengths to be adjusted as needed. Lever fastener straps 156 are provide with mating Velcro® fasteners or the like, to hold the levers 150 in place during transport and storage.

Figure 31A:
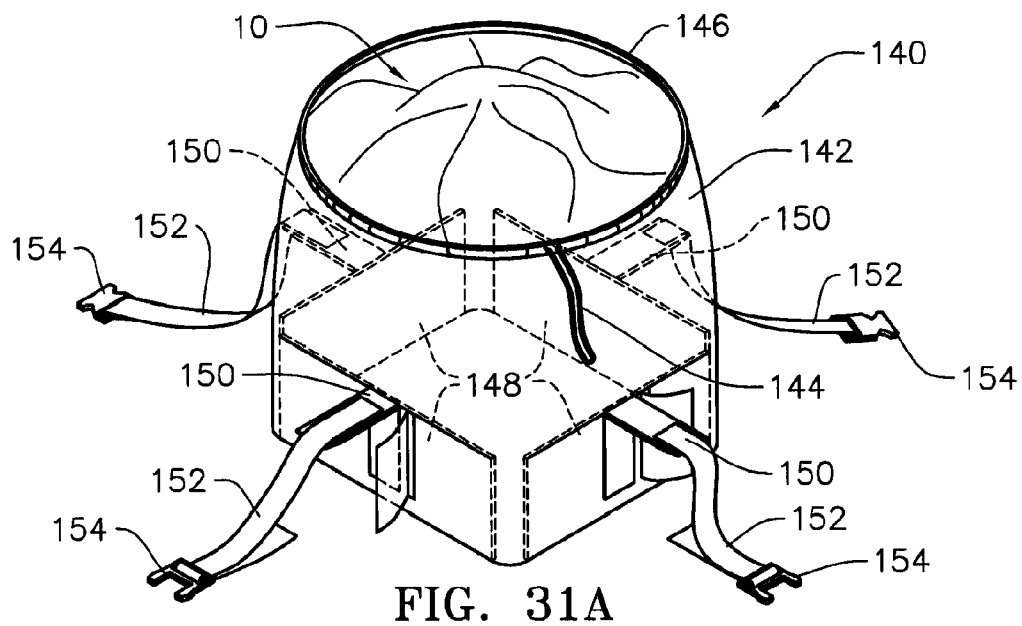
FIGS. 31A-31D illustrate an embodiment of a compression sack for compressing and storing a deflated airframe display.
Figure 31B:
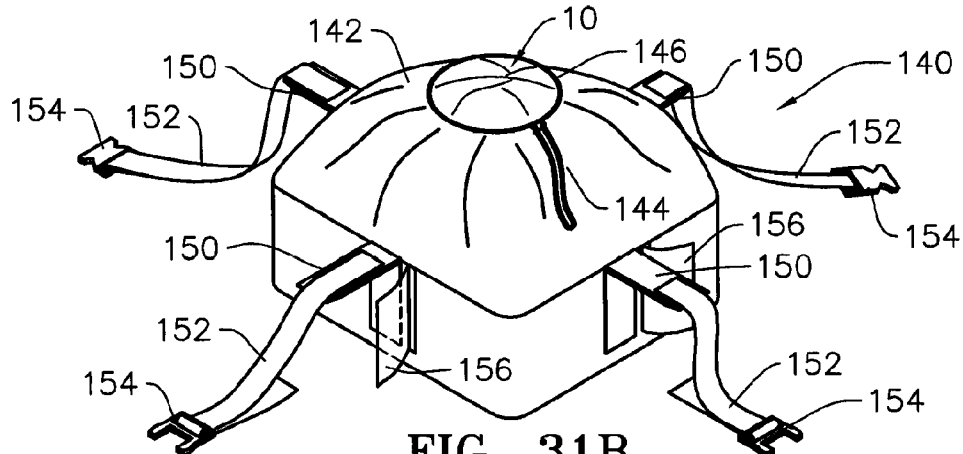
Figures 31C, 31D:
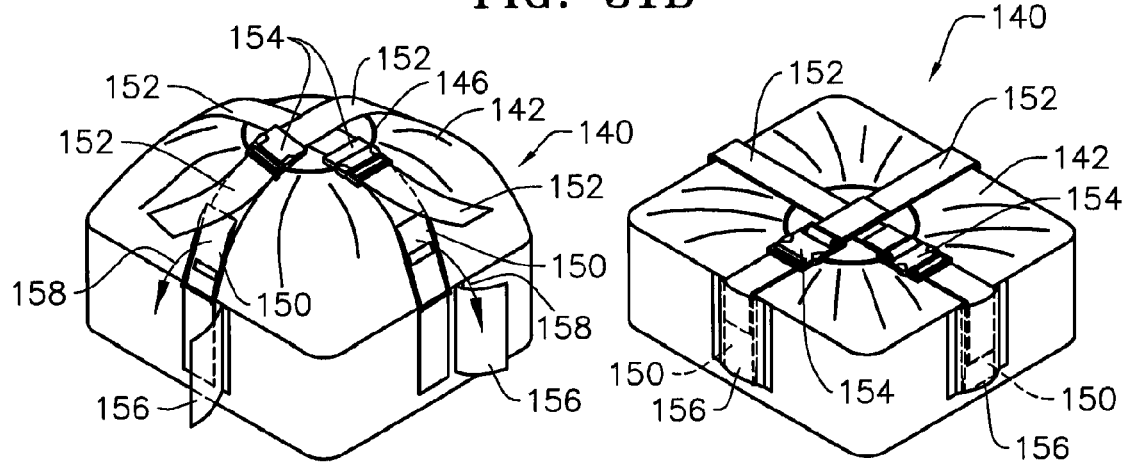

In use, the collapsed or deflated display system 10 (including the airframe 12 together with the cover 14) is stuffed into the bag 142 through the opening 146 (FIG. 31A). The bag opening 146 is cinched closed with the draw string 144 (FIG. 31B). The top of the bag with the deflated airframe display 10 therein is pushed downwardly until the ends of the straps 152 can be brought together over the top of the bag and fastened together with the connectors 154 (FIG. 31C). The ends of the straps are then pulled tight to draw the straps downwardly and to further compress the airframe display 10 within the bag 142. The levers 150 are then pivoted downwardly as indicated by arrows 158 (FIG. 31C) to further tighten the straps and to further compress the airframe display 10 within the bag 142. As previously identified, the straps 152 may be secured at different positions along the levers 150 to vary the lever arm, and thus the force required to pivot the levers 150 downwardly as the airframe display 10 is compressed into a tighter bundle. It should be appreciated that the lever 150 with the strap furthest from the hinge or pivot point would be pivoted down first, and then the other levers 150 would be pivoted downwardly in successive order from the levers having the strap attached furthest from the hinge or pivot point and ending with the lever having the strap attached closest to the hinge or pivot point. In this manner each lever 150 will require substantially the same amount of force to pivot the lever 150 downwardly as the bag 142 is compressed into a tighter bundle. As the levers are pivoted downwardly, the fastener straps 156 are secured over the levers 150 to hold them in place (FIG. 31D). The compressed bundle may then be carried, or the compressed bundle may be placed in a storage or transport container together with the inflator 60.

It has been found that with a compression sack 140 as described an illustrated in FIGS. 31A-31D, a ten foot by eight foot backwall airframe display (such as illustrated in FIG. 1) can be compressed to a size that will fit into an airline carry-on baggage along with the inflator 60. The current maximum airline carry-on baggage dimensions are 22×14×9 inches (56×36×23 cm).

Figure 32A:
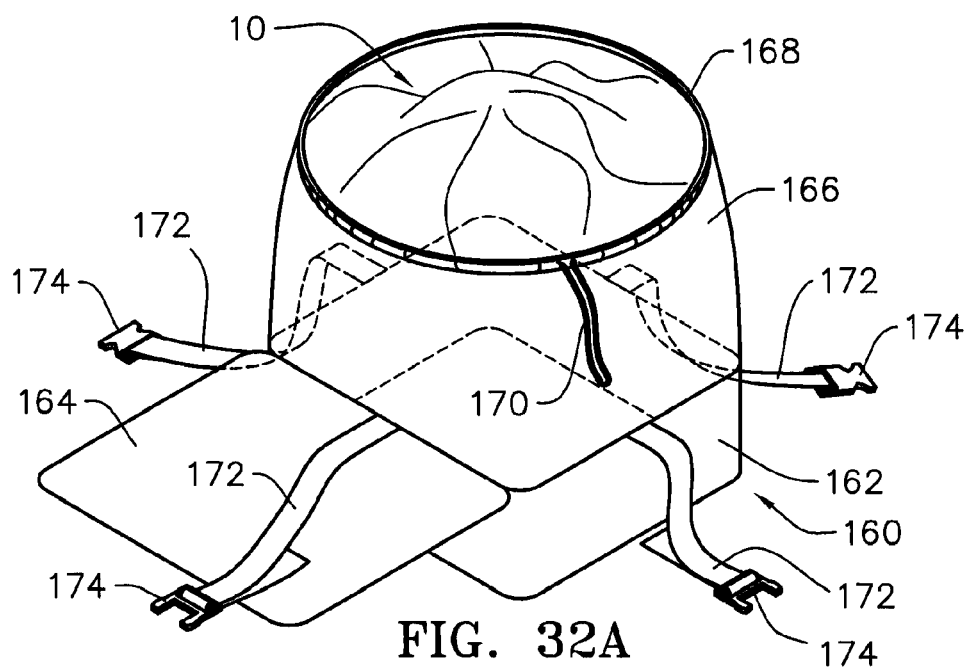
FIGS. 32A-32C illustrate an embodiment of a storage case incorporating a compression system for compressing and storing a deflated airframe display.
Figure 32B:
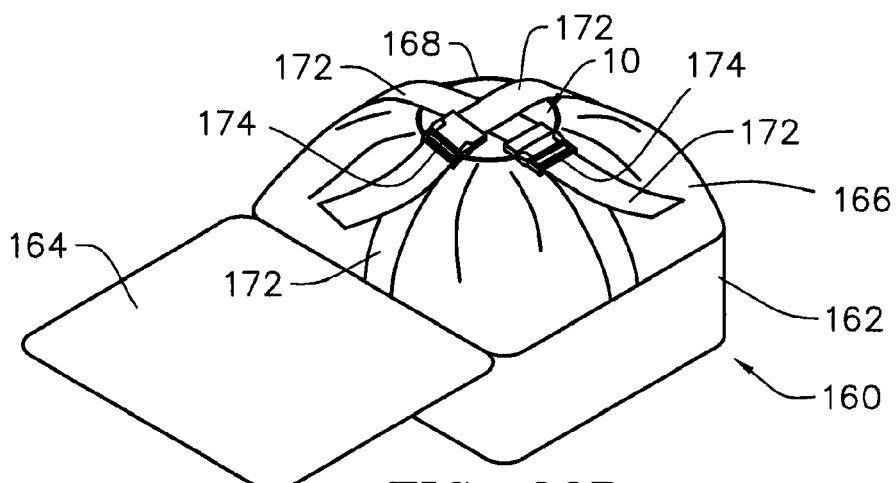
Figure 32C:
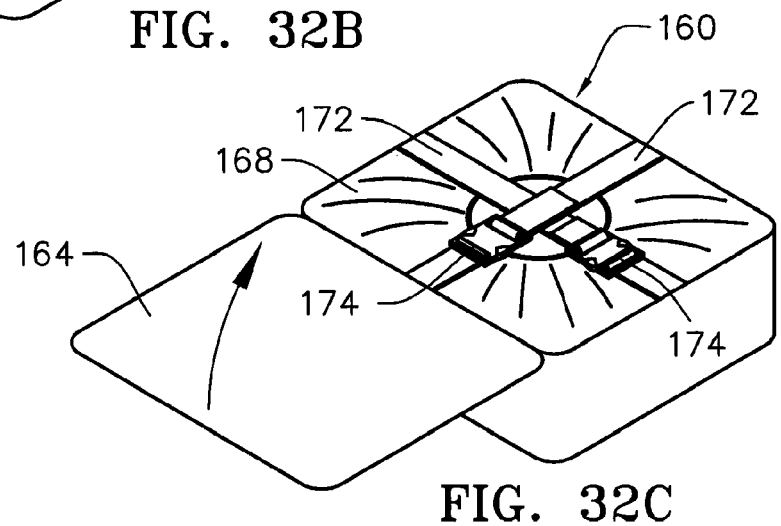

In an alternative embodiment as illustrated in FIGS. 32A-32C, a compression system may be incorporated into a storage case 160 which may include wheels or casters (not shown). In this embodiment, the storage case 160 includes a rectangular body 162 with a hinged lid 164 that may be secured by latches, zippers or other suitable closing means (not shown) as is conventional with a luggage or storage case. A wear resistant fabric compression bag 166 is secured around the interior periphery of the case body 162. The compression bag 166 includes an opening 168 at a top end with a draw string 170. The size of the compression bag 166 and the case body 162 may vary depending on the size of the airframe display to be stowed therein and whether it is desirable to meet airline canyon-on baggage size limits. Compression straps 172 are secured to the sides of the case body 162. The ends of the compression straps 172 include cooperating elements of a connector 174, such as a side-release buckle or any other suitable connector. The connectors 174 also preferably includes a strap length adjuster to permit the strap lengths to be tightened to assist in the compression of the airframe display 10.

In use, the collapsed or deflated display system 10 (including the airframe 12 together with the cover 14) is stuffed into the compression bag 166 through the opening 168 (FIG. 32A). The bag opening 168 is cinched closed with the draw string 170 (FIG. 32B). The top of the compression bag with the deflated airframe display 10 therein is pushed downwardly until the ends of the compression straps 172 can be brought together over the top of the bag and fastened together with the connectors 174 (FIG. 32B). The ends of the compression straps are then pulled tight to draw the compression straps 172 downwardly to further compress the airframe display 10 within the compression bag 166 until the lid 164 can be closed. The storage case 160 is preferably sized to also fit the inflator 60 (not shown).

Figure 33A:
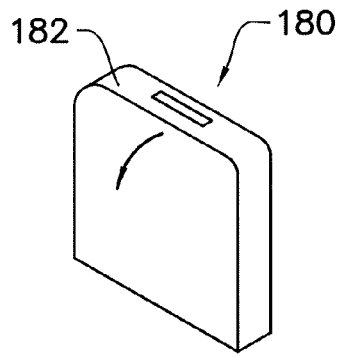
FIGS. 33A-33C illustrate an embodiment of a self-contained airframe display system with a storage case and inflator.
Figure 33B:
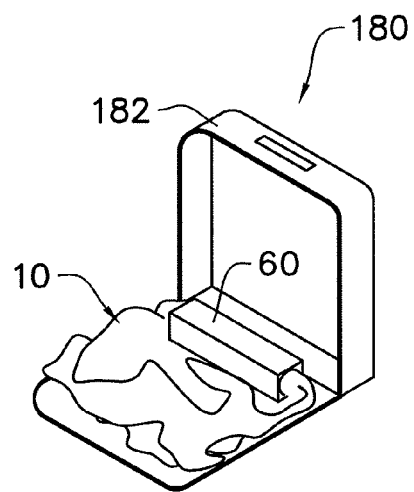
Figure 33C:
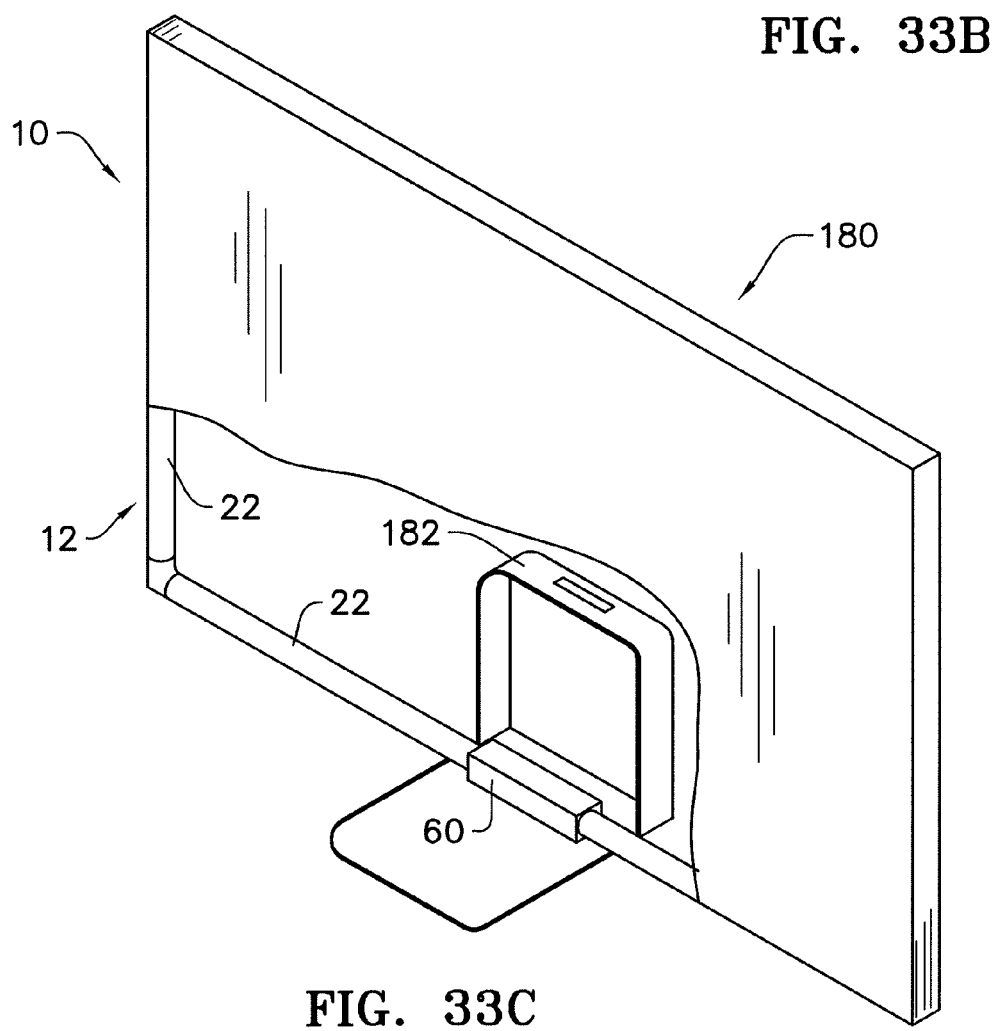

In another embodiment of the airframe display system 10 as illustrated in FIGS. 33A-33C, the airframe display system 10 may comprise part of a self-contained unit 180 which includes a travel or storage case 182 in which the inflator 60 is retained along with the deflated airframe display system 10. The storage case 182 may or may not include the compression system as described in connection with FIGS. 32A-32C. To use the self-contained unit 180, the storage case 182 is placed on the floor or other support surface and the lid 184 is opened. The deflated airframe display system 10 is preferably spread out onto the floor surface. The airframe 12 is then inflated using the inflator 60. A switch (not shown) for actuating the inflator 60 may be provided on the inflator, or on the outside of the storage case 182 for easier access, or in other suitable locations. As illustrated in FIGS. 33B-33C, the airframe 12 of the display system 10 is preferably directly connected to the inflator 60 so that it is not necessary to connect the inflator to the air port 40 on the airframe 12.

Figure 34:
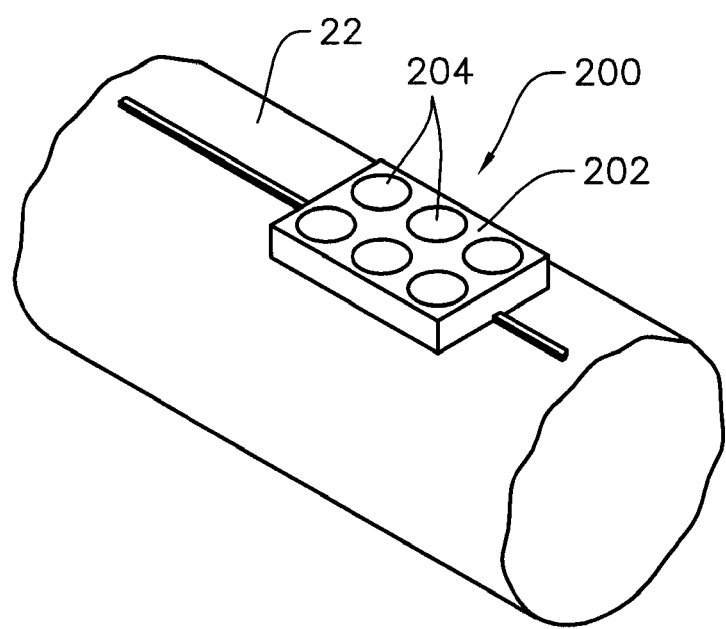
FIG. 34 is an enlarged perspective view of a lighting unit secured to an airbeam as shown in FIG. 2.
Figure 35:
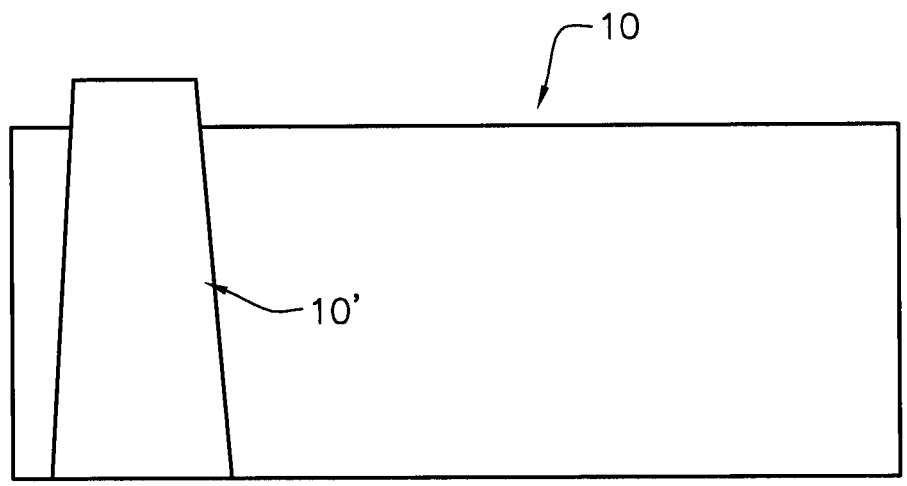
FIGS. 35-49 illustrate various configurations of airframe display systems supporting various smaller airframe display systems.
Figure 36:
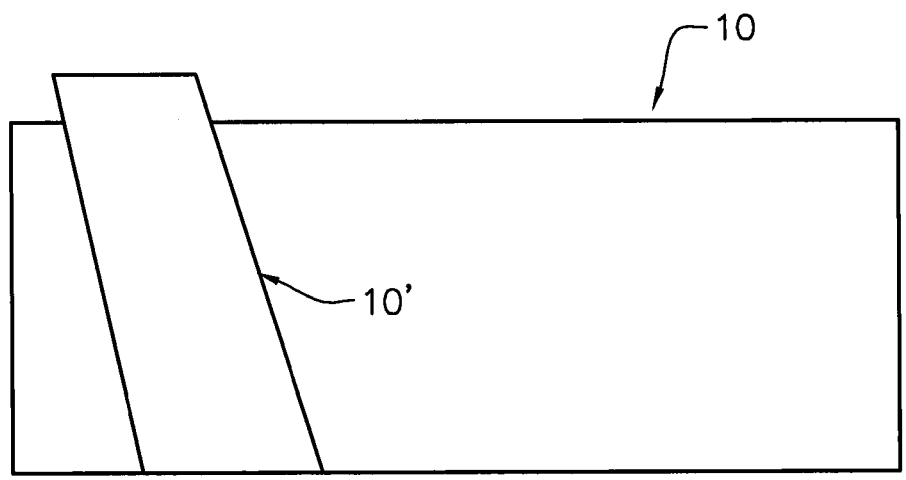
Figure 37:
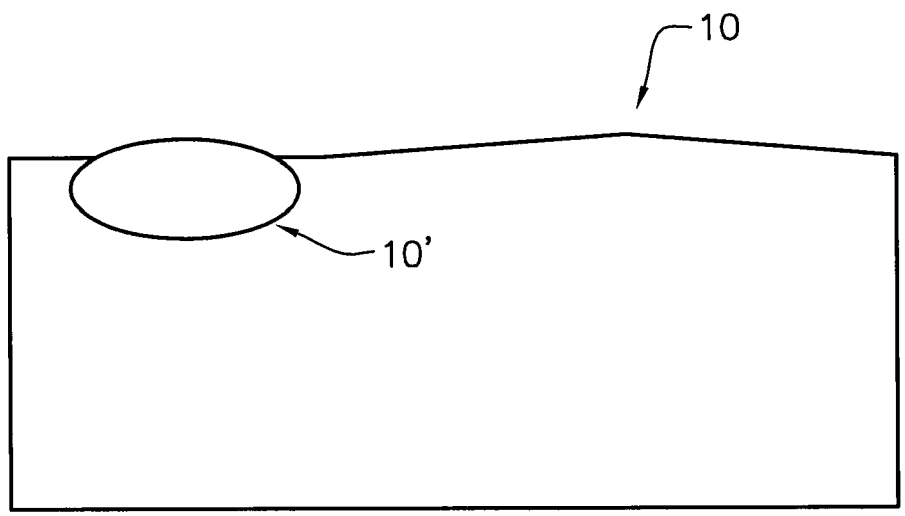
Figure 38:
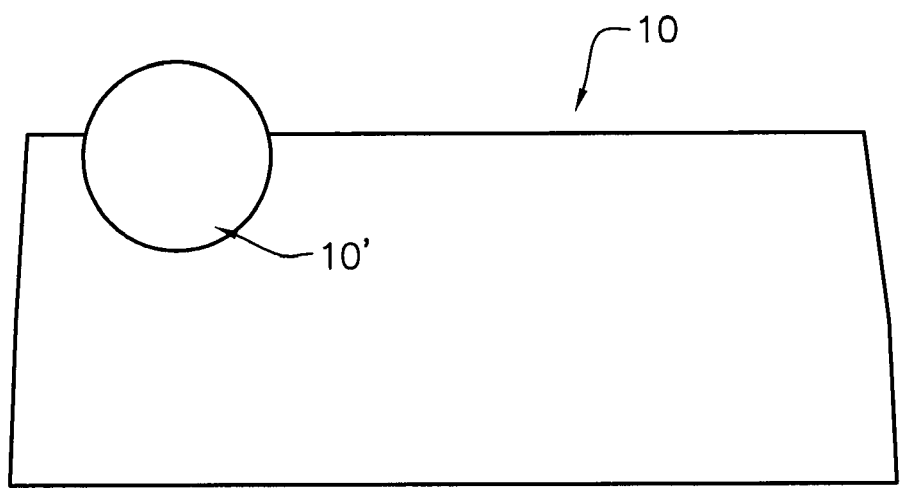
Figure 39:
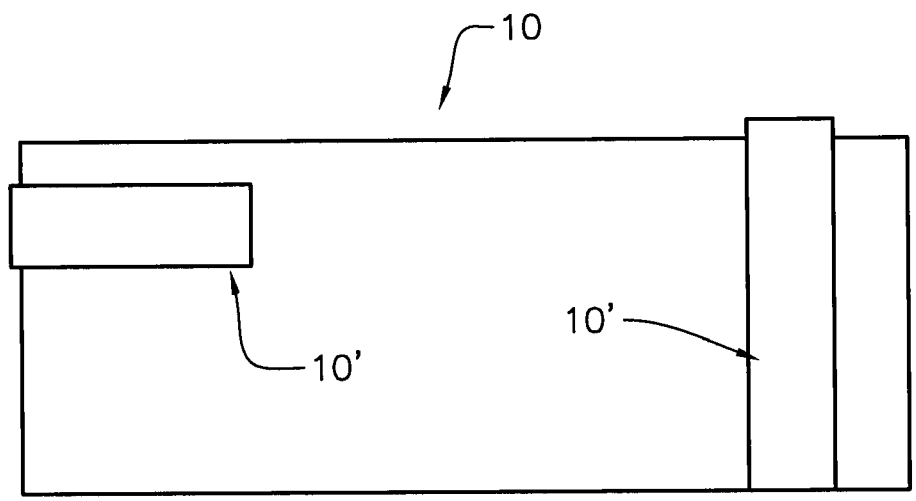
Figure 40:
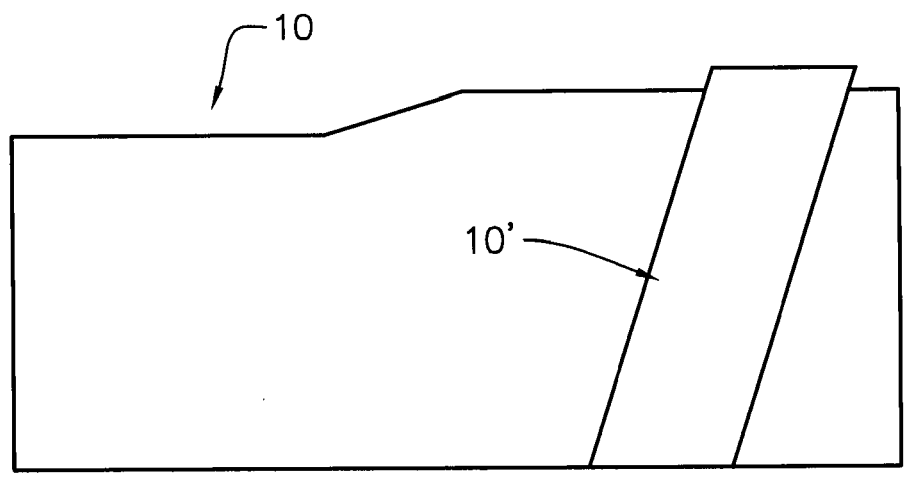
Figure 41:
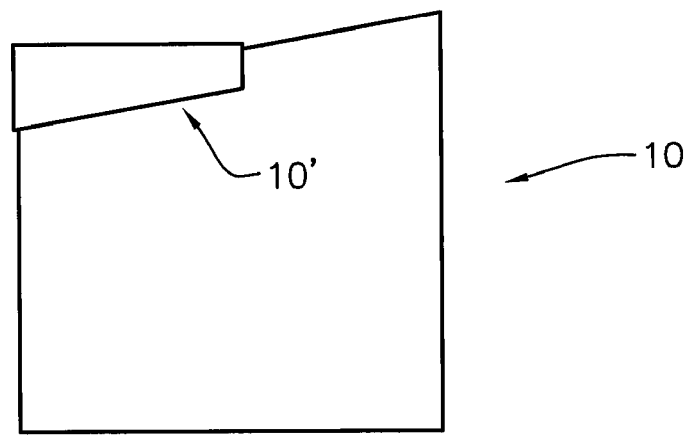
Figure 42:
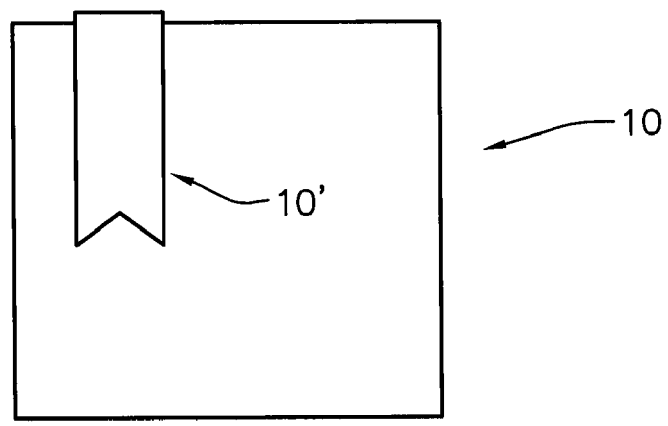
Figure 43:
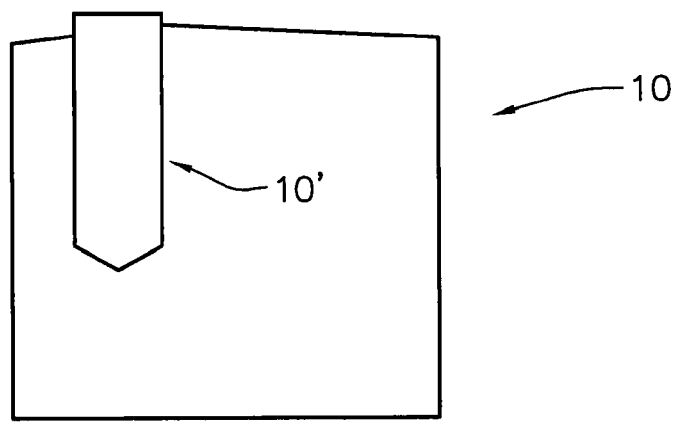
Figure 44:
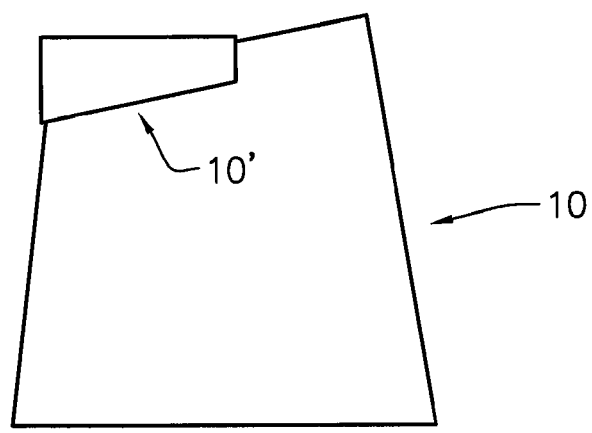
Figure 45:
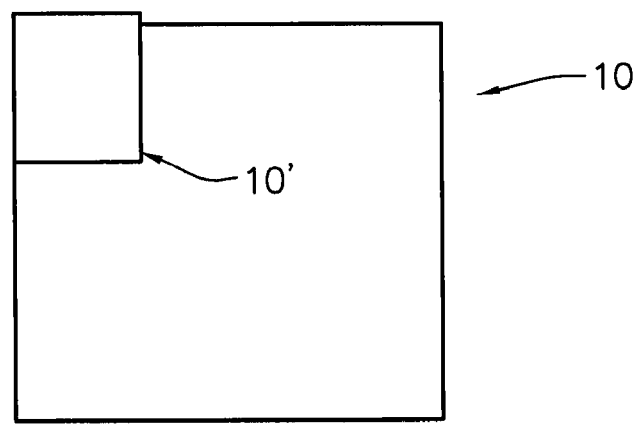
Figure 46:
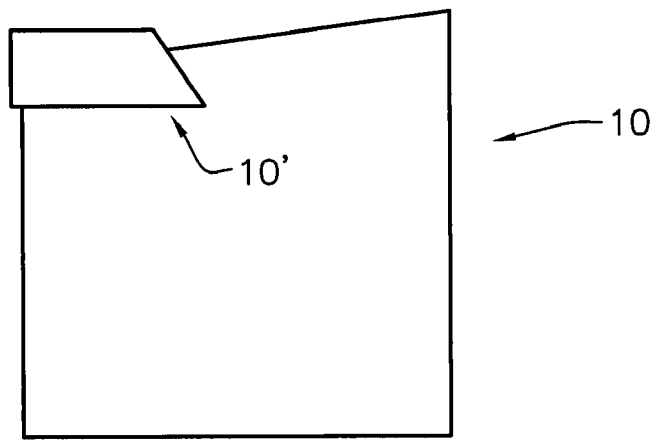
Figure 47:
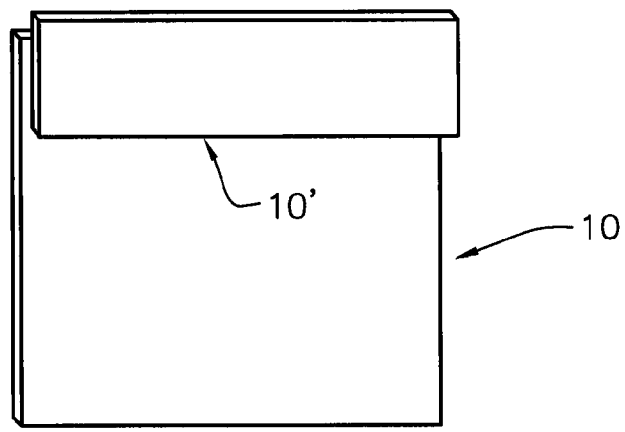
Figure 48:
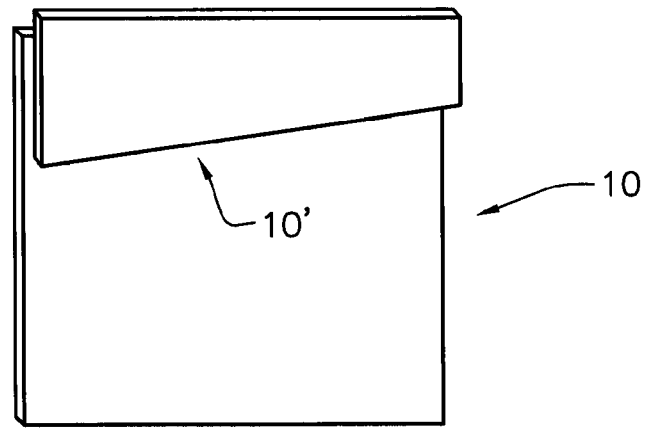
Figure 49:
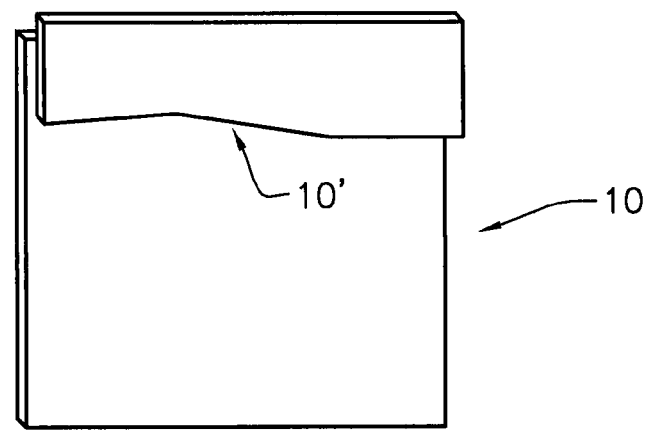

In certain embodiments, it may be desirable to provide lighting around the outer periphery of the display system 10 to illuminate the display system 10, to provide backlighting of the cover 14, and/or to illuminate the airframe 12 from the interior. FIGS. 2 and 34 illustrate an embodiment of a light system 200 comprising a light module string 202 secured around the inner periphery of the airframe 12. The lighting module string 202 are preferably comprised of a plurality of light emitting diode (LED) arrays 204. LEDs are preferred because relatively small LED arrays can emit very bright light with very little heat generation and can be powered with low voltage power source and low-voltage wires. In one embodiment the LED arrays 204 (FIG. 34) are secured by rivets, snaps, stitching, Velcro®, or other suitable attaching means to the exterior or interior of the sleeves 24 of the airbeams 22 comprising the airframe 12. In another embodiment, the LED light module string 202 may be secured by rivets, stitching, snaps or other suitable attaching means to the interior or exterior of the cover 14. A switch (not shown) may be attached to the LED light module string to turn the light system 200 on and off as desired.

It should be appreciated that the lighting module string 202 can remain secured to the airframe 12 or cover 14 without ever having to be removed. When the display system 10 is to be stored between uses, the airframe 12 is simply deflated and the entire assembly (i.e., the airframe 12, together with the cover 14 remaining on or over the airframe and with the lighting module string 202 remaining in place) is simply bundled up and stuffed into the compressions sack 140 and/or any other storage case 160. The next time the display system 10 is to be used, it is simply spread out on the floor and inflated using the inflator 60. If lighting is desired, the user need only turn on the lighting system 200 by flipping or depressing the switch. Thus, setup of a complete display system, with or without illumination can be accomplished within a matter of a few minutes. Likewise takedown and storage of a complete display system can be accomplished within a matter of a few minutes.

FIGS. 35-49 illustrate various two-dimensional display systems 10 with smaller two-dimensional airframe displays 10' attached thereto or supported therefrom using one of the above-described accessory mounts 100, parallel connector assemblies 80 or corner connector assemblies 90.

FIGS. 50-51 illustrate another airframe display system 10 comprising an airframe 12 in the form of a truss 300. The airframe truss 300 is similar to the previously described airframes 12, but may be much longer or larger. The airframe truss 300 is shown as having top and bottom airbeams 302, 304 with a plurality of gusseted airbeam struts 306. The airbeam struts 306 may be attached to the top and bottom airbeams 302, 304 or the airbeam struts 306 may be removable airbeam struts 22b as previously described. A cable or other suitable tension member 308 extends diagonally between opposing corner gussets 310. The corner gussets 310 may be made from the same material as the sleeve 24 and stitched or attached to the sleeves 24 of the beams 302, 304 and struts 322. Each gusset 310 includes a grommet 312 through which the cable or other tension member 308 is removably connected. The tension member 308, preferably includes a turnbuckle (not shown) or other suitable means of adjusting the length and tension on the tension member 308. By increasing the tension on the tension member 308, the airframe truss 300 can cantilever considerable distances beyond a vertical support without bending or bowing downwardly and may even be made to curve upwardly or downwardly as desired.

Figure 52:
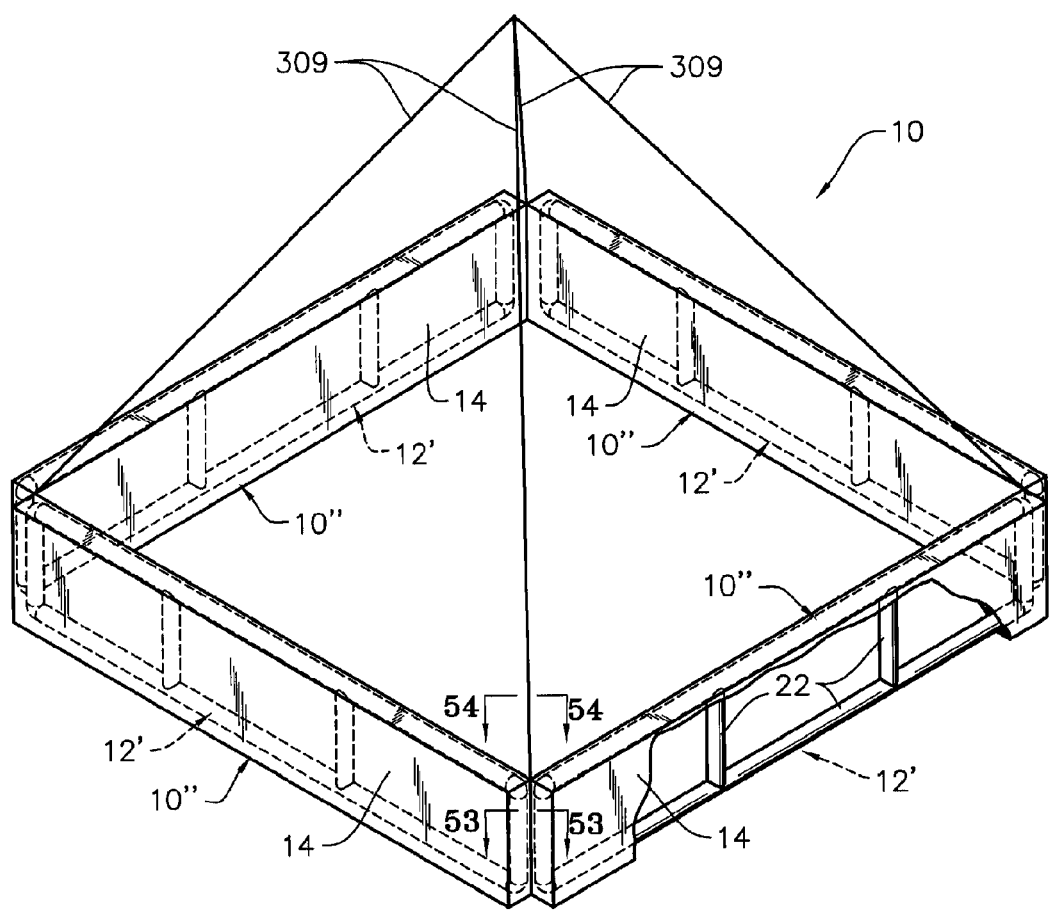
FIG. 52 is a perspective view illustrating a hanging airframe display system comprised of a plurality of modular airframes.
Figure 53:
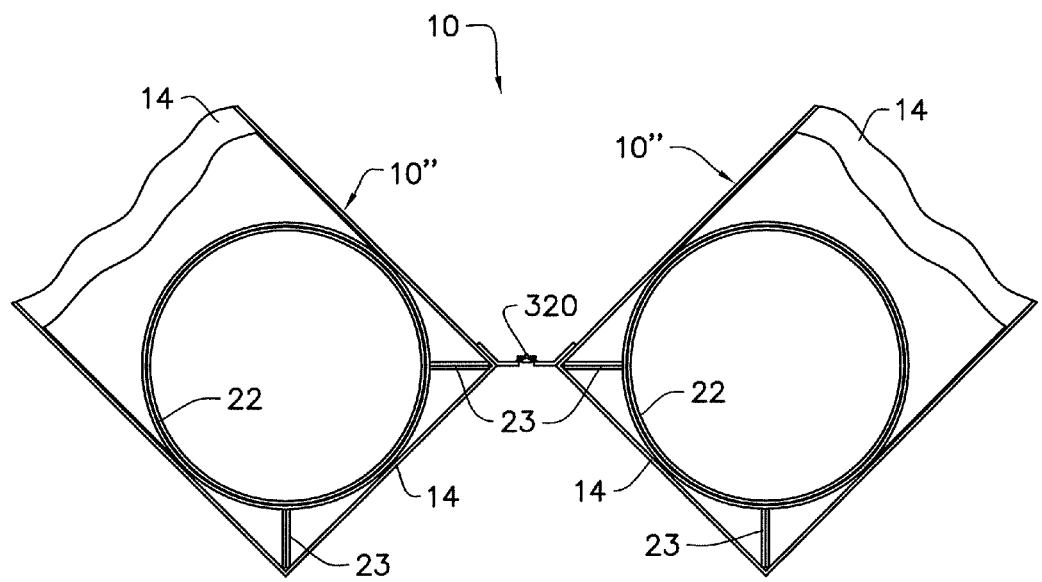
FIG. 53 is a partial cross-sectional view along lines 53-53 of FIG. 52 showing an embodiment for joining the covers of adjacent displays.

FIG. 52 illustrates a three-dimensional display system 10 which may be created by attaching multiple display systems 10 together or by attaching multiple airframe modules 12' together or for supporting other components from the airframes using the parallel connector assembly 80 and/or the corner connector assembly 90. In the example of FIG. 52, the three-dimensional display system 10 is formed by connecting four complete two-dimensional airframe sub-display systems 10" (each having its own airframe 12 and cover 14). The adjacent ends of the covers 14 of the two-dimensional sub-display systems 10" are connected together by a vertical zipper 320 (FIG. 53) or other suitable connecting means such as snaps or Velcro®, for example, to form a single large display that may be supported overhead by cables 309. It should be appreciated that different configurations of a three-dimensional modular display system 10 may be created by varying the number of airframe sub-display systems 10" joined together or by having different sized or shaped airframe sub-displays 10" joined together. For example, rather than a square as shown, a triangle may be formed by joining three sub-display systems 10'". Likewise, a pentagon or hexagon shaped display may be formed by joining five or six airframe sub-displays 10'" together.

Figure 54:
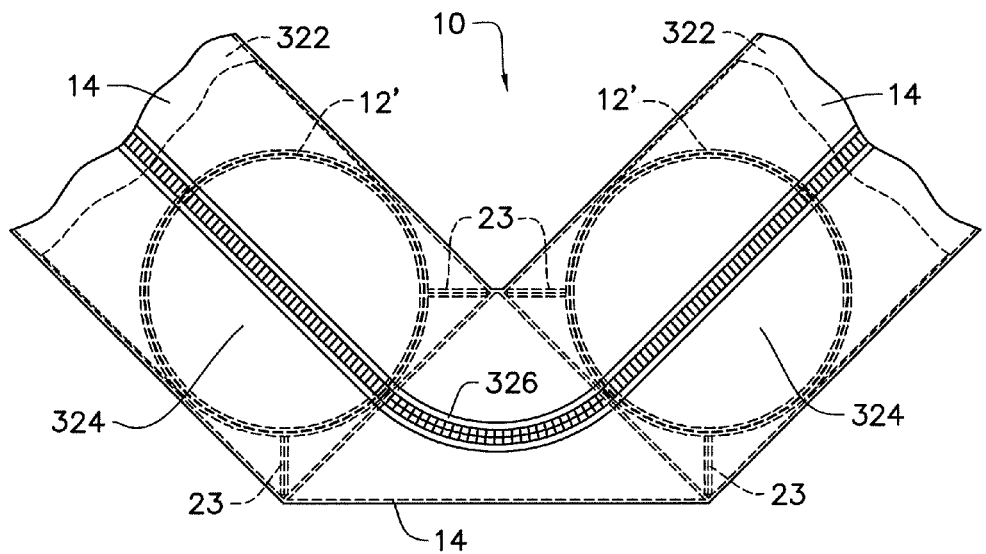
FIG. 54 is a partial cross-sectional view along lines 54-54 of FIG. 52 showing an embodiment for joining modular airframes with a single cover.

Rather than joining separate airframe sub-displays 10" together to form a modular airframe display 10 as previously described, a three-dimensional airframe display 10 may be created by joining together airframe modules 12' by a single cover 14 to form a three dimensional display 10. As shown in FIG. 54, the single cover 14 may include multiple pockets 322 having an open top end 324 through which the airframe modules 12' are inserted. A horizontal zipper 326 or other suitable closing means is provided to close the top end 324 of the pockets 322. Different shaped display systems may be created by varying the number and/or length of the airframe modules 12' and providing different shaped covers 14 with corresponding pockets 322 for each of the shapes.

Figure 55:
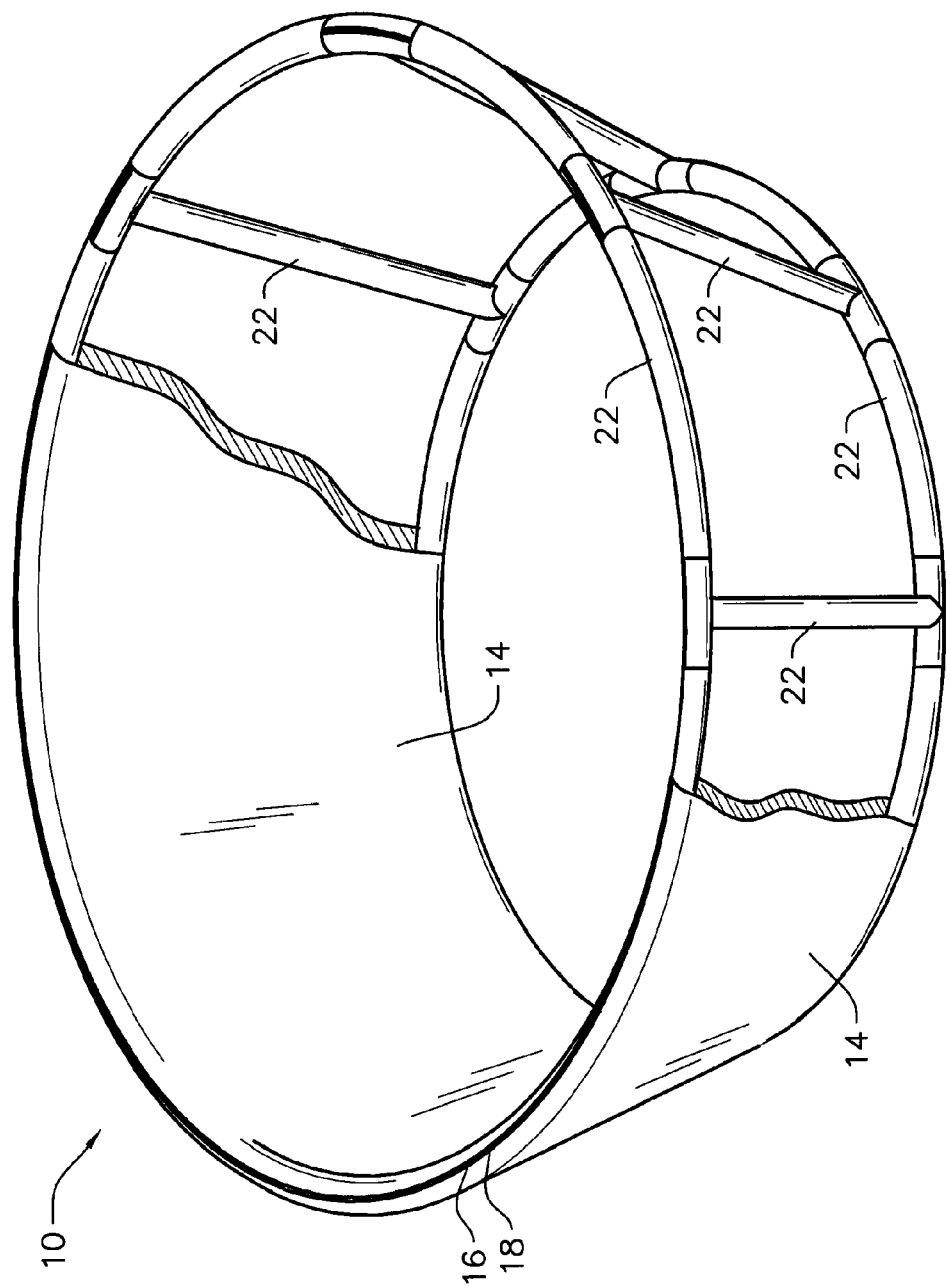
FIG. 55 is a perspective view of an embodiment of a frustoconical airframe display system with a partial cutaway of the cover to show the airbeams of the airframe.
Figure 56:
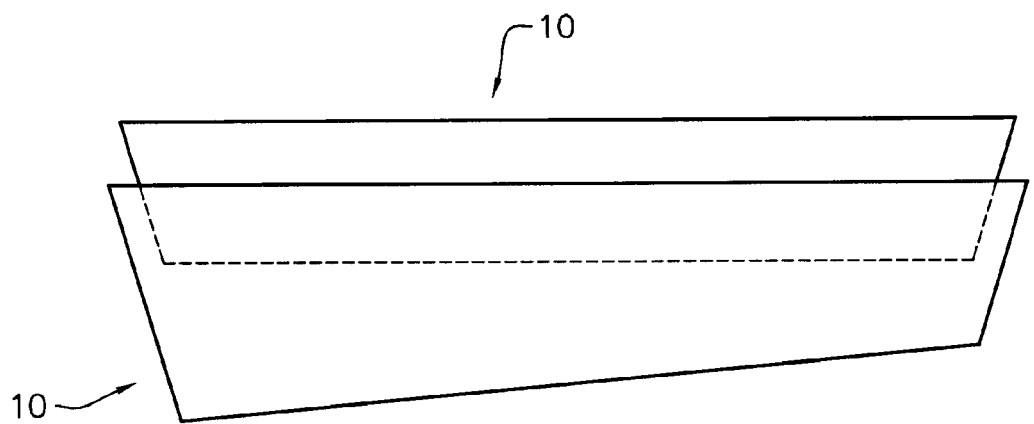
FIGS. 56-70 illustrate various embodiments of three-dimensional hanging airframe display systems comprising nested airframe displays.
Figure 57:
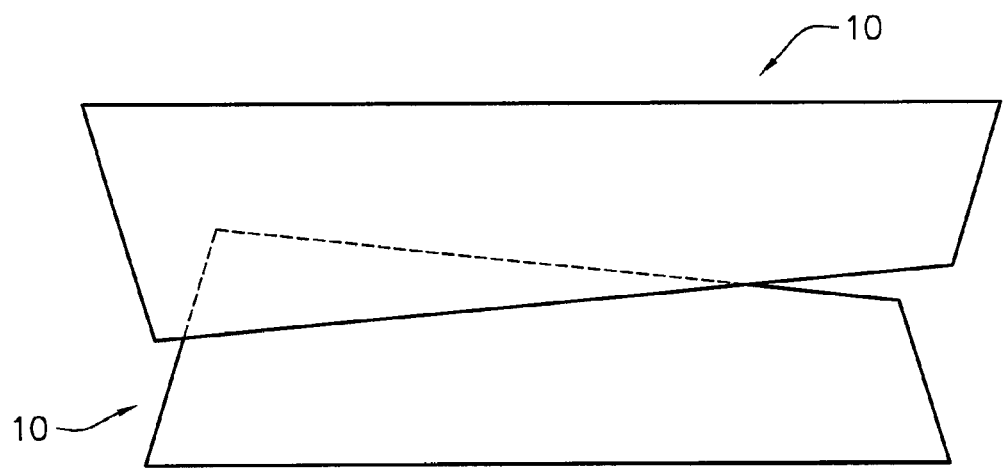
Figure 58:
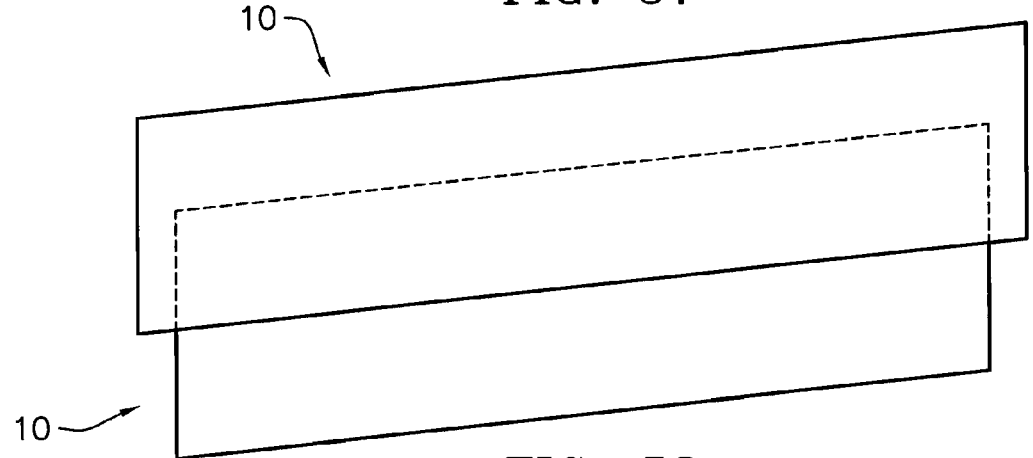
Figure 59:
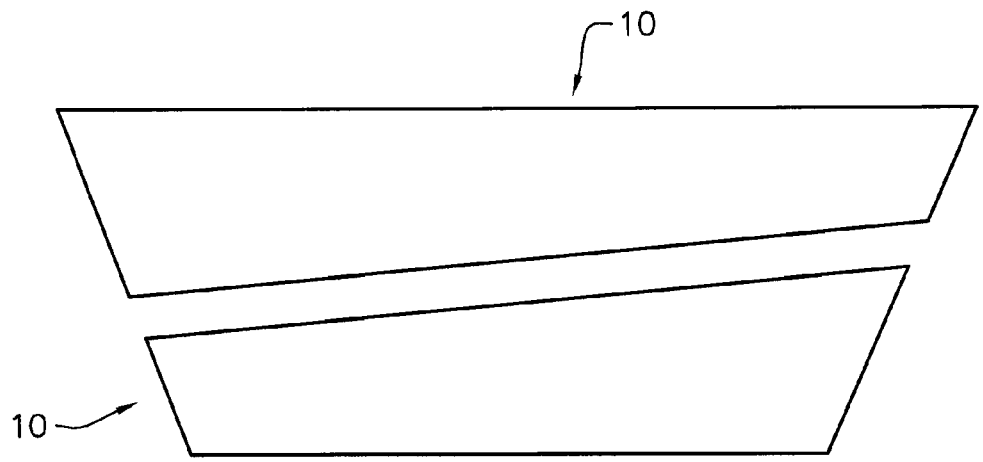
Figure 60:
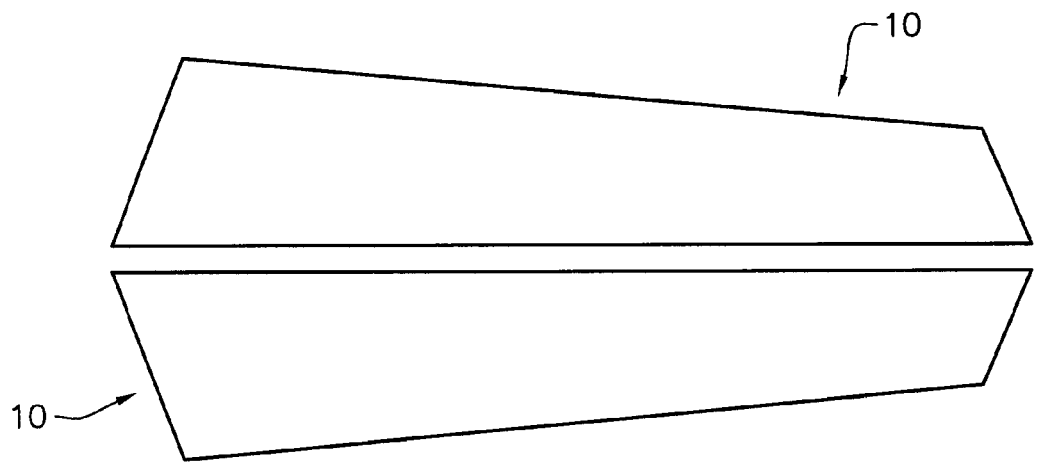
Figure 61:
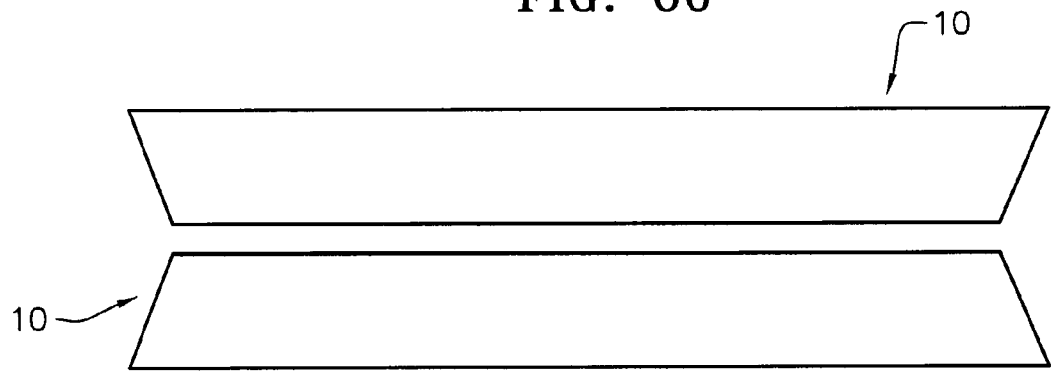

FIG. 55 is a perspective view of another three-dimensional airframe display system 10 comprising an airframe 12 with upper and lower circular airbeams 22 and a plurality of spaced vertically disposed airbeams 22 surrounded by a single cover 14. The cover 14 includes an opening 16 and closing means 18 as previously described.

FIGS. 56-70 illustrate various three-dimensional airframe displays 10 comprising a combination of two nesting three-dimensional airframe displays 10 of the same, different or complimentary shapes to form a unique display system that may be hung overhead by cables (not shown) or supported on a floor or other support surface.

Based on the foregoing, it should be appreciated that airframe displays systems 10 may be made into virtually any size, shape or configuration. The airframe displays 10, in comparison to their conventional rigid frame counterparts, are very lightweight and they can be quickly set up and quickly taken down by simply inflating and deflating the airframe 12. Furthermore, as described above, the airframe display systems 10 are capable of being packed and compressed into a relatively small storage case as compared to conventional display system utilizing a rigid frame thereby reducing drayage costs. Another advantage of an airframe display system 10 over rigid framed display systems is that, due to their light weight, rigging costs are substantially reduced if it is desired to hang the display from the ceiling or roof structure of a building or other facility and there is little concern that the airframe display system 10 will overload the roof structure. Likewise, there may be no need for obtaining special permits from the building or facility manager for rigging an airframe display system 10 to hang overhead from the roof structure as would typically be required with a much heavier rigid framed display, thereby avoiding delays and added costs typically associated with obtaining approvals from building or facility managers.

Furthermore, greater cantilever or overhang sections can also be achieved with an airframe display system 10 than is practicable with rigid frame display systems because there is much less weight extending beyond the support structure. Less weight extending beyond the support structure translates into smaller shear and bending forces and moments of inertia acting on the structural support. As such, the size, shape and configuration of an airframe display system 10 is not limited or dictated by the structural support, rigging and weight to the extent that such factors limit or dictate rigid display systems. Thus, airframe display systems 10 typically afford more flexibility in size, shape and configuration and more flexibility with respect to locating the display within a facility than a conventional rigid frame display.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A display system, comprising:
a stretch fabric cover forming an enclosure having a predetermined configuration and predetermined dimensions when in a non-stretched condition, said enclosure further having a front surface area and a back surface area, said enclosure further having an opening providing access to an interior of said enclosure;
an airtight inflatable airframe having an inflated condition and a non-inflated condition, said airframe received within said interior of said enclosure through said opening when in said non-inflated condition, said airframe comprising at least one airbeam, said at least one airbeam comprising a sleeve of dimensionally stable material defining a predetermined sleeve dimension, said predetermined sleeve dimension defining a depth of said airframe, said airframe, when in said inflated condition, configured to have a shape corresponding to said predetermined configuration of said enclosure, said airframe, when in said inflated condition having dimensions greater than said dimensions of said enclosure when in said non-stretched condition;
whereby, when in said inflated condition, said airframe is substantially rigid and said stretch fabric cover is drawn taut over said airframe such that said front surface area and said back surface area of said stretch fabric cover are substantially smooth and spaced a distance apart by said predetermined sleeve dimension.

2. The display system of claim 1 wherein said at least one airbeam has an airtight air bladder.

3. The display system of claim 2 wherein said airtight air bladder is removable from said sleeve.

4. The display system of claim 3 wherein said sleeve includes an opening for removing said removable air bladder, said opening having a closing means.

5. The display system of claim 1 wherein said airtight airframe comprises a plurality of airbeams, each of said plurality of airbeams comprising a sleeve of dimensionally stable material.

6. The display system of claim 5 wherein each of said plurality of airbeams has an airtight air bladder.

7. The display system of claim 6 wherein each of said airbladders are fluidly connected by tubular jumpers.

8. The display system of claim 1 wherein said airtight airframe comprises a plurality of modular airtight airframes, each of said plurality of modular airtight airframes having an airbeam comprising a sleeve of dimensionally stable material.

9. The display system of claim 8 wherein each of said airbeam of said plurality of modular airframes has an airtight bladder.

10. The display system of claim 9 wherein each of said air bladders of said airbeams are fluidly connected by tubular jumpers.

11. The display system of claim 8 wherein said plurality of modular airframes are secured together at adjacent ends.

12. The display system of claim 8 wherein said plurality of modular airframes are secured together by said stretch fabric cover enclosure.

13. The display system of claim 12 wherein said modular airframes, when inflated, together with said stretch fabric cover enclosure, define a three dimensional shape.

14. The display system of claim 13 wherein said front and back surface areas of each of said plurality of separate stretch fabric cover enclosures are substantially planar.

15. The display system of claim 13 wherein at least one of said plurality of modular airframes is curvilinear.

16. The display system of claim 13 wherein at least one of said plurality of modular airframes includes a curvilinear side.

17. The display system of claim 8 wherein said stretch fabric cover enclosure comprises a plurality of separate stretch fabric cover enclosures each received over one of said plurality of modular airframes.

18. The display system of claim 17 wherein said separate stretch fabric cover enclosures are secured together at adjacent ends with one of said adjacent ends of said stretch fabric cover enclosures has a first partial zipper element and another of said adjacent ends of said stretch fabric cover enclosures has a second partial zipper element, whereby said first and second partial zipper elements cooperate to form a complete zipper such that said adjacent ends of said stretch fabric covers enclosures removably zip together.

19. The display system of claim 1 wherein said stretch fabric cover enclosure comprises at least two layers with one of said layers being substantially opaque.

20. The display system of claim 1 wherein said stretch fabric cover enclosure comprises at least three layers with one of said layers being substantially opaque.

21. The display system of claim 1 wherein said stretch fabric cover enclosure comprises an intermediate stretch fabric cover enclosure and a stretch fabric display panel; said stretch fabric display panel removably attachable to said intermediate stretch fabric cover enclosure, said stretch fabric display panel comprising said front surface area.

22. The display system of claim 21 wherein said intermediate stretch fabric cover enclosure includes a substantially opaque surface.

23. The display system of claim 22 wherein said intermediate stretch fabric cover enclosure has a first partial zipper element and said stretch fabric display panel has a second partial zipper element, wherein said first and second partial zipper elements cooperate to form a complete zipper such that said stretch fabric display panel removably zips to said intermediate stretch fabric cover enclosure.

24. The display system of claim 21 wherein said intermediate stretch fabric cover enclosure has a first partial zipper element and said stretch fabric display panel has a second partial zipper element, wherein said first and second partial zipper elements cooperate to form a complete zipper such that said stretch fabric display panel removably zips to said intermediate stretch fabric cover enclosure.

25. The display system of claim 1 wherein said airframe, when inflated, together with said stretch fabric cover enclosure, defines a substantially two dimensional shape wherein length and height dimensions of said airframe when in said inflated condition is substantially greater than said sleeve dimension.

26. The display system of claim 25 wherein said front and back surface areas are substantially planar.

27. The display system of claim 25 wherein said front and back surface areas are curvilinear.

28. The display system of claim 25 wherein said airframe includes at least one curvilinear side.

29. The display system of claim 1 further comprising LED lighting secured to said airframe, said LED lighting units connected to a power source whereby said front surface area of said stretch fabric cover enclosure is illuminated by said LED lighting units.

30. The display system of claim 1 further comprising LED lighting units secured to said stretch fabric cover enclosure, said LED lighting units connected to a power source whereby said front surface area is illuminated by said LED lighting units.

31. The display system of claim 1 further comprising an inflator.

32. The display system of claim 31 wherein said inflator is a compressed air tank.

33. The display system of claim 31 wherein said inflator is an air pump.

34. The display system of claim 1 wherein said airframe is inflated to a pressure between a range of about 1 psi to about 15 psi.

35. The display system of claim 34 wherein said airbeam includes at least one air port for inflating and deflating said airframe, said air port having sufficient volumetric capacity such that upon opening said at least one air port, said airframe will deflate from a pressure of about 15 psi to a pressure of about 1 psi in about 10 seconds.

36. The display system of claim 35 wherein said at least one air port includes a spring biased valve that is movable between a closed position and an open position, and wherein said valve is lockable in said open position for deflation of said airframe.

37. The display system of claim 1 further including an accessory mount for mounting an accessory to said at least one airbeam of said airframe, said accessory mount comprising a removable sleeve of dimensionally stable fabric with a closing means for removably but fixably securing said accessory mount to said at least one airbeam.

38. The display system of claim 37 wherein said removable sleeve comprises a pocket for receiving an accessory mounting bracket.

39. The display system of claim 37 wherein said removable sleeve includes a metal plate and said accessory mount further comprises a spacer member having first and second magnetic ends, whereby said spacer member is magnetically supported at said first magnetic end from said metal plate and wherein said accessory is magnetically supported from said second magnetic end.

40. The display of claim 37 wherein said accessory is a monitor.

41. The display of claim 37 wherein said accessory is a shelf.

42. The display system of claim 37 wherein said accessory is a second airframe display system comprising:
   an airtight airframe having at least one airbeam comprising a sleeve of dimensionally stable material; and
   a stretch fabric cover received over said airframe;
   whereby, upon inflation, said airframe is substantially rigid and said stretch fabric cover is taut over said airframe defining a front surface area.

43. The display system of claim 1 further comprising a compression sack, said compression sack capable of compressing said deflated airframe display system such that said display system, when deflated and compressed, is entirely received and stored within said compression sack.

44. The display system of claim 43 wherein said compression sack is capable of compressing said deflated airframe display system into a size that will fit into an airline carry-on baggage size together with an inflator.

45. The display system of claim 1 further comprising a storage case having a compression system, said compression system capable of compressing said deflated airframe display system such that said display system, when deflated and compressed, is entirely received and stored within said storage case.

46. The display system of claim 45 wherein said storage case is an airline carry-on baggage size.

47. A display method comprising the steps of:
a) placing an airframe display system on a surface, said airframe display system comprising:
   i) a stretch fabric cover forming an enclosure having a predetermined configuration and predetermined dimensions when in a non-stretched condition, said enclosure further having a front surface area and a back surface area, said enclosure further having an opening providing access to an interior of said enclosure;
   ii) an airtight inflatable airframe having an inflated condition and a non-inflated condition, said airframe received within said interior of said enclosure through said opening when in said non-inflated condition, said airframe comprising at least one airbeam, said at least one airbeam comprising a sleeve of dimensionally stable material defining a predetermined sleeve dimension, said predetermined sleeve dimension defining a depth of said airframe, said airframe, when in said inflated condition, configured to have a shape corresponding to said predetermined configuration of said enclosure, said airframe, when in said inflated condition having dimensions greater than said dimensions of said enclosure when in said non-stretched condition;
b) attaching an inflator to an air port on said at least one airbeam;
c) inflating said airframe to said inflated condition with said inflator until said airframe is substantially rigid and said stretch fabric cover is drawn taut over said airframe such that said front surface area and said back surface area of said stretch fabric cover are substantially smooth and spaced a distance apart by said predetermined sleeve dimension.

48. The method of claim 47 wherein said at least one airbeam has an airtight air bladder.

49. The method of claim 48 wherein said airtight air bladder is removable from said sleeve.

50. The method of claim 49 wherein said sleeve includes an opening for removing said removable air bladder, said opening having a closing means.

51. The method of claim 48 wherein said airtight airframe comprises a plurality of airbeams, each of said plurality of airbeams comprising a sleeve of dimensionally stable material.

52. The method of claim 51 wherein each of said plurality of airbeams has an airtight air bladder.

53. The method of claim 52 wherein each of said airbladders are fluidly connected by tubular jumpers.

54. The method of claim 47 wherein said airtight airframe comprises a plurality of modular airtight airframes, each of said plurality of modular airtight airframes having an airbeam comprising a sleeve of dimensionally stable material.

55. The method of claim 54 wherein each of said airbeams of said plurality of modular airframes has an airtight bladder.

56. The method of claim 55 wherein each of said air bladders of said airbeams are fluidly connected by tubular jumpers.

57. The method of claim 54 further comprising the step of securing said plurality of modular airframes together at adjacent ends.

58. The method of claim 54 further comprising the step of securing said plurality of modular airframes together by said stretch fabric cover enclosure.

59. The method of claim 58 wherein said modular airframes, when inflated, together with said stretch fabric cover enclosure, define a three dimensional shape.

60. The method of claim 59 wherein said front and back surface areas of each of said plurality of separate stretch fabric cover enclosures are substantially planar.

61. The method of claim 59 wherein at least one of said plurality of modular airframes is curvilinear.

62. The method of claim 59 wherein said at least one of said plurality of modular airframes includes a curvilinear side.

63. The method of claim 54 wherein said stretch fabric cover enclosure comprises a plurality of separate stretch fabric cover enclosures each received over one of said plurality of modular airframes, said method further comprising the step of securing each of said stretch fabric covers enclosures together at adjacent ends.

64. The method of claim 63 wherein one of said adjacent ends of said stretch fabric cover enclosures has a first partial zipper element and another of said adjacent ends of said stretch fabric cover enclosures has a second cooperating partial zipper element, said method further comprising the step of zipping said first and second partial zipper elements together.

65. The method of claim 47 wherein said stretch fabric cover enclosure comprises at least two layers with one of said layers being substantially opaque.

66. The method of claim 47 wherein said stretch fabric cover enclosure comprises at least three layers with one of said layers being substantially opaque.

67. The method of claim 47 wherein said stretch fabric cover enclosure comprises an intermediate stretch fabric cover and a stretch fabric display panel, said stretch fabric display panel comprising said front surface area, said method further comprising the step of attaching said stretch fabric display panel to said intermediate stretch fabric cover enclosure.

68. The method of claim 67 wherein said intermediate stretch fabric cover enclosure includes a substantially opaque surface.

69. The method of claim 68 wherein said intermediate stretch fabric cover enclosure has a first partial zipper element and said stretch fabric display panel has a second cooperating partial zipper element, wherein said attaching step comprises zipping said stretch fabric display panel to said intermediate stretch fabric cover enclosure.

70. The method of claim 67 wherein said intermediate stretch fabric cover enclosure has a first partial zipper element and said stretch fabric display panel has a second cooperating partial zipper element, wherein said attaching step comprises zipping said stretch fabric display panel to said intermediate stretch fabric cover enclosure.

71. The method of claim 47 wherein said airframe, when inflated, together with said stretch fabric cover enclosure, defines a substantially two dimensional shape wherein length and height dimensions of said airframe, when in an inflated condition, is substantially greater than said predetermined sleeve dimension.

72. The method of claim 71 wherein said front and back surface areas are substantially planar.

73. The method of claim 71 wherein said front and back surface areas are curvilinear.

74. The method of claim 71 wherein said airframe includes at least one curvilinear side.

75. The method of claim 47 further including the steps of illuminating said front surface area.

76. The method of claim 75 wherein the step of illuminating said front surface area includes securing LED lighting units to said airframe and electrically connecting said LED lighting units to a power source.

77. The method of claim 75 wherein the step of illuminating said front surface area includes securing LED lighting units to said stretch fabric cover enclosure and electrically connecting said LED lighting units to a power source.

78. The method of claim 47 wherein said inflator is a compressed air tank.

79. The method of claim 47 wherein said inflator is an air pump.

80. The method of claim 47 wherein said airframe is inflated to a pressure between a range of about 1 psi to about 15 psi.

81. The method of claim 47 further comprising the step of deflating said airframe display system by locking a spring biased valve of said air port in an open position.

82. The method of claim 81 wherein said air port has sufficient volumetric capacity such that upon locking said valve in said open position, said airframe will deflate from a pressure of about 15 psi to a pressure of about 1 psi in about 10 seconds.

83. The method of claim 47 further comprising the step of deflating said airframe display and compressing said deflated airframe display system with a compression sack and storing said deflated and compressed airframe display system within said compressions sack.

84. The method of claim 83 wherein said compression sack is capable of compressing said airframe display to fit into an airline carry-on baggage.

85. The method of claim 47 further comprising the step of deflating said airframe display and storing said deflated airframe into a storage case having a compression system, said compression system capable of compressing said deflated airframe display system such that said display system, when deflated and compressed, is entirely received and stored within said storage case, said storage case meeting airline carry-on baggage size limits.

86. The method of claim 47 further comprising attaching an accessory mount to said at least one airbeam of said airframe for mounting an accessory, said accessory mount comprising a removable sleeve of dimensionally stable fabric with a closing means for removably but fixably securing said accessory mount to said at least one airbeam.

87. The method of claim 86 wherein said removable sleeve comprises a pocket for receiving an accessory mounting bracket.

88. The method of claim 86 wherein said removable sleeve includes a metal plate and said accessory mount further comprises a spacer member having first and second magnetic ends, whereby said spacer member is magnetically supported at said first magnetic end from said metal plate and wherein said accessory is magnetically supported from said second magnetic end.

89. The method of claim 86 wherein said accessory is a monitor.

90. The method of claim 86 wherein said accessory is a shelf.

91. The method of claim 86 wherein said accessory is a second airframe display system comprising:
    an airtight airframe having at least one airbeam comprising a sleeve of dimensionally stable material; and
    a stretch fabric cover received over said airframe;
    whereby, upon inflation, said airframe is substantially rigid and said stretch fabric cover is taut over said airframe defining a front surface area.

\* \* \* \* \*